US012602569B2

(12) United States Patent
Veyseh et al.

(10) Patent No.: US 12,602,569 B2
(45) Date of Patent: Apr. 14, 2026

(54) EXTRACTING ENTITY RELATIONSHIPS FROM DIGITAL DOCUMENTS UTILIZING MULTI-VIEW NEURAL NETWORKS

(71) Applicant: Adobe Inc., San Jose, CA (US)

(72) Inventors: Amir Pouran Ben Veyseh, Eugene, OR (US); Franck Dernoncourt, Sunnyvale, CA (US); Quan Tran, San Jose, CA (US); Lidan Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1562 days.

(21) Appl. No.: 17/087,881

(22) Filed: Nov. 3, 2020

(65) Prior Publication Data

US 2022/0138534 A1 May 5, 2022

(51) Int. Cl.
| | |
|---|---|
| *G06N 3/045* | (2023.01) |
| *G06F 17/16* | (2006.01) |
| *G06F 40/295* | (2020.01) |
| *G06F 40/30* | (2020.01) |
| *G06N 3/047* | (2023.01) |

(52) U.S. Cl.
CPC ............. *G06N 3/045* (2023.01); *G06F 17/16* (2013.01); *G06F 40/295* (2020.01); *G06F 40/30* (2020.01); *G06N 3/047* (2023.01)

(58) Field of Classification Search
CPC ...... G06N 3/045; G06N 3/047; G06F 40/295; G06F 40/30; G06F 17/16
USPC ......................................................... 706/15
See application file for complete search history.

(56) References Cited

U.S. PATENT DOCUMENTS

| | | | | | |
|---|---|---|---|---|---|
| 9,836,533 | B1 * | 12/2017 | Levi | ........................ | G06Q 30/02 |
| 2008/0097951 | A1 * | 4/2008 | Gupta | .................... | G06N 5/025 |
| | | | | | 706/59 |
| 2020/0302953 | A1 * | 9/2020 | Ando | ...................... | G10L 25/30 |
| 2020/0372225 | A1 * | 11/2020 | Xu | ............................ | G06N 3/08 |
| 2021/0021621 | A1 * | 1/2021 | Janakiraman | ......... | H04L 41/142 |

OTHER PUBLICATIONS

Hao et al, 2019, "Towards Better Modeling Hierarchical Structure for Self-Attention with Ordered Neurons" (Year: 2019).*

(Continued)

*Primary Examiner* — Abdullah Al Kawsar
*Assistant Examiner* — Jun Kwon
(74) *Attorney, Agent, or Firm* — Keller Preece PLLC

(57) ABSTRACT

This disclosure describes methods, non-transitory computer readable storage media, and systems that utilize a plurality of neural networks to determine structural and semantic information via different views of a word sequence and then utilize this information to extract a relationship between word sequence entities. For example, the disclosed systems generate a plurality of sets of encoded word representation vectors utilizing the plurality of neural networks. The disclosed system then extracts the relationship from an overall word representation vector generated based on the sets of encoded word representation vectors. Furthermore, the disclosed system enforces structural and semantic consistency between views via a plurality of constrains involving a control mechanism for the semantic view and a plurality of losses.

20 Claims, 12 Drawing Sheets

(56)                References Cited

OTHER PUBLICATIONS

Li et al, Jan. 2020, "Bidirectional LSTM with self-attention mechanism and multi-channel features for sentiment classification" (Year: 2020).*

Jo & Myaeng, Jul. 2020, "Roles and Utilization of Attention Heads in Transformer-based Neural Language Models" (Year: 2020).*

Li et al, Sep. 2020, "Syntax Role for Neural Semantic Role Labeling" (Year: 2020).*

Liu et al, 2018, "Long Length Document Classification by Local Convolutional Feature Aggregation" (Year: 2018).*

Belghazi, M. I.; Baratin, A.; Rajeswar, S.; Ozair, S.; Bengio, Y.; Courville, A.; and Hjelm, R. D. 2018. Mine: mutual information neural estimation. In ICML.

Chan, Y. S., and Roth, D. 2010. Exploiting background knowledge for relation extraction. In COLING.

Fu, L.; Nguyen, T. H.; Min, B.; and Grishman, R. 2017. Domain adaptation for relation extraction with domain adversarial neural network. In IJCNLP.

Guo, Z.; Zhang, Y.; and Lu, W. 2019. Attention guided graph convolutional networks for relation extraction. In ACL.

Hendrickx, I.; Kim, S. N.; Kozareva, Z.; Nakov, P.; O Seaghdha, D.; Pado, S.; Pennacchiotti, M.; Romano, L.; and Szpakowicz, S. 2010. Semeval—2010 task 8: Multi-way classification of semantic relations between pairs of nominals. In the 5th International Workshop on Semantic Evaluation.

Hjelm, R. D.; Fedorov, A.; Lavoie-Marchildon, S.; Grewal, K.; Bachman, P.; Trischler, A.; and Bengio, Y. 2019. Learning deep representations by mutual information estimation and maximization. In ICLR.

Liu, Y.; Wei, F.; Li, S.; Ji, H.; Zhou, M.; and Wang, H. 2015. A dependency-based neural network for relation classification. In ACL.

Miwa, M., and Bansal, M. 2016. End-to-end relation extraction using lstms on sequences and tree structures. In ACL.

Nguyen, T. H., and Grishman, R. 2014. Employing word representations and regularization for domain adaptation of relation extraction. In ACL.

Nguyen, T. H., and Grishman, R. 2015a. Relation extraction: Perspective from convolutional neural networks. In Proceedings of the 1st NAACL Workshop on Vector Space Modeling for NLP (VSM).

Nguyen, T. H., and Grishman, R. 2016. Combining neural networks and log-linear models to improve relation extraction. In Proceedings of IJCAI Workshop on Deep Learning for Artificial Intelligence.

Nguyen, T. H., and Grishman, R. 2018a. Graph convolutional networks with argument-aware pooling for event detection. In AAAI.

Nguyen, T. H.; Plank, B.; and Grishman, R. 2015c. Semantic representations for domain adaptation: A case study on the tree kernel-based method for relation extraction. In ACL-IJCNLP.

Peng, N.; Poon, H.; Quirk, C.; Toutanova, K.; and Yih, W.-t. 2017. Cross-sentence n-ary relation extraction with graph lstms. In TACL.

Plank, B. 2011. Domain adaptation for parsing. In Ph.D. thesis. University of Groningen.

Shen, Y.; Tan, S.; Sordoni, A.; and Courville, A. 2019. Ordered neurons: Integrating tree structures into recurrent neural networks. In ICLR.

Shi, G.; Feng, C.; Huang, L.; Zhang, B.; Ji, H.; Liao, L.; and Huang, H. 2018. Genre separation network with adversarial training for cross-genre relation extraction. In EMNLP.

Socher, R.; Huval, B.; Manning, C. D.; and Ng, A. Y. 2012. Semantic compositionality through recursive matrix-vector spaces. In EMNLP.

Song, L.; Zhang, Y.; Wang, Z.; and Gildea, D. 2018. N-ary relation extraction using graph state lstm. In EMNLP.

Strubell, E.; Verga, P.; Andor, D.; Weiss, D.; and McCallum, A. 2018. Linguistically-informed self-attention for semantic role labeling. In EMNLP.

Sun, A.; Grishman, R.; and Sekine, S. 2011. Semi-supervised relation extraction with large-scale word clustering. In ACL.

Tai, K. S.; Socher, R.; and Manning, C. D. 2015. Improved semantic representations from tree-structured long short-term memory networks. In ACL.

Tran, V.-H.; Phi, V.-T.; Shindo, H.; and Matsumoto, Y. 2019. Relation classification using segment-level attention-based cnn and dependency-based rnn. In NAACL-HLT.

Vaswani, A.; Shazeer, N.; Parmar, N.; Uszkoreit, J.; Jones, L.; Gomez, A. N.; Kaiser, L. u.; and Polosukhin, I. 2017. Attention is all you need. In NIPS.

Verga, P.; Strubell, E.; and McCallum, A. 2018. Simultaneously self-attending to all mentions for full-abstract biological relation extraction. In EMNLP.

Veyseh, A. P. B.; Nguyen, T. H.; and Dou, D. 2019. Improving cross-domain performance for relation extraction via dependency prediction and information flow control. In IJCAI.

Wang, L.; Cao, Z.; de Melo, G.; and Liu, Z. 2016. Relation classification via multi-level attention cnns. In EMNLP.

Xu, Y.; Mou, L.; Li, G.; Chen, Y.; Peng, H.; and Jin, Z. 2015. Classifying relations via long short term memory networks along shortest dependency paths. In EMNLP.

Yu, M.; Gormley, M. R.; and Dredze, M. 2015. Combining word embeddings and feature embeddings for fine-grained relation extraction. In NAACL-HLT.

Zelenko, D.; Aone, C.; and Richardella, A. 2003. Kernel methods for relation extraction. In Journal of machine learning research.

Zeng, D.; Liu, K.; Lai, S.; Zhou, G.; and Zhao, J. 2014. Relation classification via convolutional deep neural network. In COLING.

Zhang, Y.; Zhong, V.; Chen, D.; Angeli, G.; and Manning, C. D. 2017. Position-aware attention and supervised data improve slot filling. In EMNLP.

Zhang, Y.; Qi, P.; and Manning, C. D. 2018. Graph convolution over pruned dependency trees improves relation extraction. In EMNLP.

Zhou, G.; Su, J.; Zhang, J.; and Zhang, M. 2005. Exploring various knowledge in relation extraction. In ACL.

* cited by examiner

600

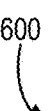

---

Generating A First Set Of Encoded Word Representation Vectors For A Word Sequence Utilizing An LSTM Neural Network                                                                    602

---

Generating A Second Set Of Encoded Word Representation Vectors For The Word Sequence Utilizing A Ranked Neurons LSTM Neural Network                                                   604

Generating A Set Of Structural Importance Scores For The Word Sequence *606*

---

Generating A Third Set Of Encoded Word Representation Vectors For The Word Sequence Utilizing A Self-attention Neural Network                                                         608

Generating A Set Of Semantic Importance Scores For The Word Sequence *610*

---

Extracting A Relationship Between Two Entities From The Word Sequence                                                                                                                612

Generating A Relationship Probability Distribution *614*

Computing Device
700

Processor
702

Memory
704

Storage
706

I/O Interface
708

Communication Interface
710

EXTRACTING ENTITY RELATIONSHIPS FROM DIGITAL DOCUMENTS UTILIZING MULTI-VIEW NEURAL NETWORKS

BACKGROUND

Based on improvements to computer processing and modeling, some computing systems can automatically determine relationships between entities mentioned in digital text—albeit with varying accuracy and limited application across different domains. For example, determining semantic relationships between entities can be a useful task in downstream applications that utilize natural language processing, such as for populating a knowledge base. Generating resources that indicate semantic relationships between entities in digital text is an important, but difficult, task due to the fluid nature of language and different possible interpretations of word sequences that depend on the context of the surrounding text. Although some conventional systems exist for predicting relationships between digital text entities, these systems have a number of technical shortcomings, particularly with regard to accuracy and flexibility across different knowledge domains and language.

SUMMARY

This disclosure describes one or more embodiments of methods, non-transitory computer readable media, and systems that solve the foregoing problems in addition to providing other benefits by utilizing a plurality of neural networks to determine structural and semantic information via different views of a word sequence and then utilizing this information to extract a relationship between word sequence entities. To illustrate, the disclosed systems utilize a ranked neurons long short-term memory neural network to determine a structural importance of words in the word sequence. Additionally, the disclosed systems utilize a self-attention neural network to determine a semantic importance of words in the word sequence. The disclosed systems then extract a relationship between entities in the word sequence based on the determined structural importance and the determined semantic importance utilizing a multi-class classification network. In some implementations, the disclosed systems also implement a variety of processes and constraints (e.g., a multi-vector control mechanism, hidden vector contribution scores, mutual information loss, structure loss, and/or classification loss) to provide accuracy and structural-semantic consistency between the representations determined by the neural network architectures. By determining the structural and semantic importance of the words in the word sequence while constraining the neural networks to ensure structural and semantic consistency across the multi-view relation extraction process, the disclosed systems can accurately and flexibly extract relationships between the entities mentioned in the word sequence.

BRIEF DESCRIPTION OF THE DRAWINGS

The detailed description refers to the drawings briefly described below.

FIG. 6 illustrates a flowchart of a series of acts for extracting a relation between entities utilizing multi-view neural networks in accordance with one or more implementations.

DETAILED DESCRIPTION

Figure 1:
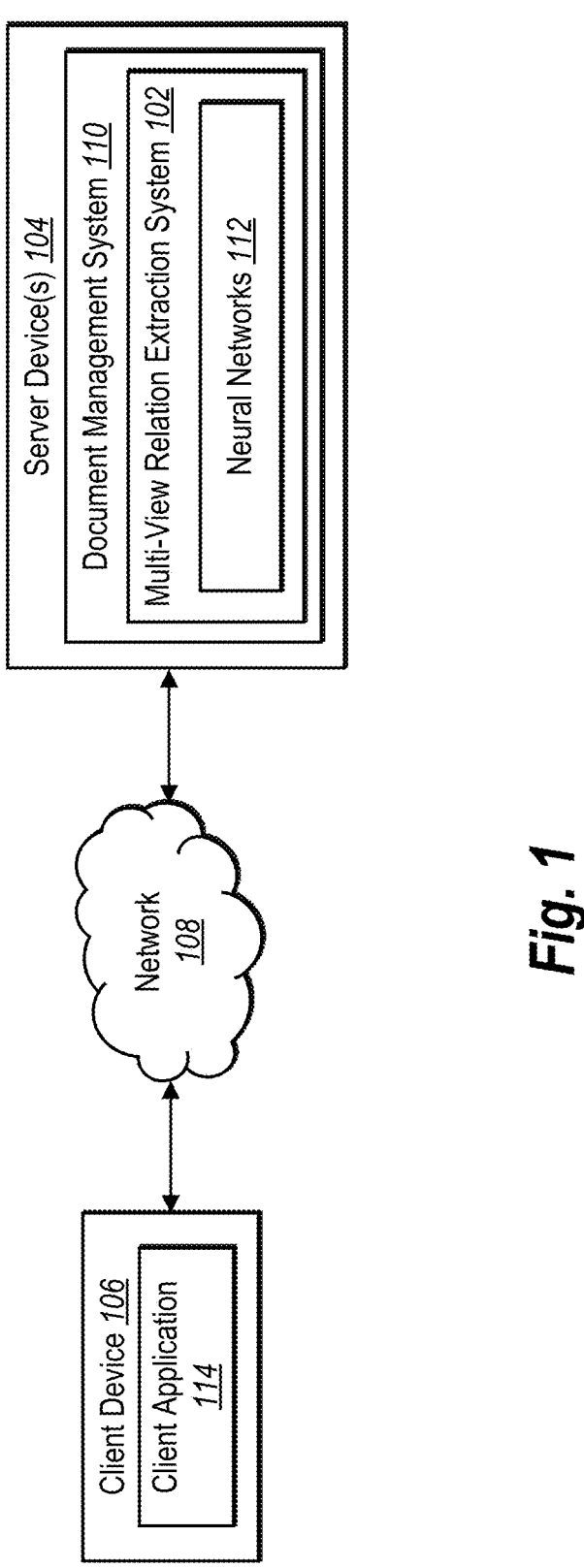
FIG. 1 illustrates a block diagram of a system environment in which a multi-view relation extraction system can operate in accordance with one or more implementations.

This disclosure describes one or more embodiments of a multi-view relation extraction system (also "relation extraction system") that utilizes a plurality of neural networks to perform a multi-view process for extracting relationships between entities mentioned in a sequence of words. In particular, in one or more embodiments the relation extraction system utilizes two different neural network architectures to determine implicit structural and semantic representations for the words in the sequence. More specifically, the relation extraction system can utilize a ranked neurons long short-term memory neural network to determine the structural representations and a self-attention neural network to determine the semantic representations. Additionally, in some implementations the relation extraction system utilizes a plurality of constraints to improve accuracy in addition to structural and semantic consistency between the representations determined by the two neural network architectures.

In one or more embodiments, the relation extraction system processes a sequence of words to generate word representation vectors for the sequence of words. To illustrate, in some implementations the sequence of words includes a sentence that mentions at least two entities and a relationship between the entities. For instance, the relation extraction system generates word representation vectors by generating embeddings from the sequence of words (e.g., pre-trained word embeddings, position embeddings, and/or entity type embeddings) to capture entity mentions and their positions within the sequence of words.

Additionally, in one or more embodiments the relation extraction system utilizes a plurality of neural networks to encode different information from the sequence of words into different sets of encoded word representation vectors. For example, the relation extraction system utilizes a long short-term memory neural network (e.g., a bidirectional long short-term memory neural network) to generate a first set of encoded word representation vectors. To illustrate, the long short-term memory neural network generates a sequence of hidden vectors from the embeddings representing the words in the sequence. In particular, the hidden vectors generated by the long short-term memory neural network capture semantic information for the whole sequence of words.

Furthermore, in some embodiments the relation extraction system utilizes a ranked neurons long short-term memory neural network to generate a second set of encoded word representation vectors. Specifically, the ranked neurons long short-term memory neural network includes a set of additional master gates (e.g., a forget gate and an input gate) to generate a sequence of hidden vectors from the embeddings while encoding structural information from the sequence of words into the hidden vectors. For instance, the ranked neurons long short-term memory neural network generates the hidden vectors based on importance scores that indicate a relative proximity of each word to a root node of a tree structure, in which the root node corresponds to a word with a highest importance score.

Furthermore, in one or more embodiments the relation extraction system utilizes a self-attention neural network to generate a third set of encoded word representation vectors. In particular, the self-attention neural network includes a self-attention layer that receives, as input, the first set of encoded word representation vectors from the long short-term memory neural network (e.g., the hidden vectors from the bidirectional long short-term memory neural network). For example, the self-attention neural network generates a sequence of hidden vectors from the first set of encoded word representation vectors based on semantic connections (e.g., connection scores) between pairs of words in the sequence of words. By generating the third set of encoded word representation vectors based on the first set of encoded word representation vectors and the connection scores, the relation extraction system encodes additional context information for the sequence of words into the relation extraction process. In additional embodiments, the relation extraction system utilizes a control mechanism to further modify the third set of encoded word representation vectors based on a control vector from the first set of encoded word representation vectors to maintain consistent semantic information between the first and third sets of encoded word representation vectors.

After generating sets of encoded word representation vectors via the long short-term memory neural network, the ranked neurons long short-term memory neural network, and the self-attention neural network, the relation extraction system extracts a relationship between at least two entities in the sequence of words. In one or more embodiments, the relation extraction system combines the sets of encoded word representation vectors into an overall word representation vector for the sequence of words. The relation extraction system then extracts a relationship from the overall word representation vector by utilizing a classification neural network to generate a probability distribution over possible relationships for the entities. Additionally, the relation extraction system utilizes the probability distribution to determine the relationship between the entities, for example, by selecting a possible relationship with the highest relationship probability as the relationship between the entities.

In one or more embodiments, the relation extraction system provides structural and semantic consistency across the neural networks by utilizing a plurality of losses associated with the neural networks. For instance, the relation extraction system determines a structure loss by utilizing a Kullback-Leibler divergence loss indicating a structural consistency between implied structures from the hidden vectors generated by the rankled neurons long short-term memory neural network and the self-attention neural network. Additionally, the relation extraction system determines a mutual information loss based on a mutual information metric between the first set of word representation vectors generated by the long short-term memory neural network and the second set of word representation vectors generated by the ranked neurons long short-term memory neural network. Furthermore, the relation extraction system determines a classification loss associated with a predicted probability (e.g., by a classification neural network) for labeling a relationship between two entities in the sequence of words. The relation extraction system can jointly train the neural networks based on these various losses.

As mentioned above, conventional information extraction systems suffer from a number of technical shortcomings with regard to implementing computing devices. For example, existing information extraction systems lack accuracy and flexibility. For example, some existing information extraction systems rely on external (e.g., third-party) parsers or tools that are configured for specific domains and/or languages. Because the existing systems rely on the external parsers to parse text and determine syntactic trees for text structures, the existing systems are limited to usefulness in the domains and/or languages corresponding to the external tools. Accordingly, using the external tools outside of the specific domains/languages results in inaccurate determination of structural and semantic information.

Additionally, existing information extraction systems lack accuracy due to the lack of control over the behavior of external parsers. Specifically, because the external parsers are independent and pre-trained, the existing systems are unable to ensure that the external parsers generate optimal structures from word sequences (e.g., sentence structures). Due to the inability of the existing information extraction systems to verify the accuracy of the structures generated by independent, external parsers, the varying accuracy of the sentence structures can result in inaccurate relation extractions. Furthermore, inaccurate relation extractions can also result in inaccurate natural language processing in downstream applications.

The disclosed relation extraction system demonstrates a number of technical improvements over existing systems. For example, the relation extraction system can improve the flexibility and accuracy of systems that utilize natural language processing. To illustrate, while some conventional systems rely on external parsers or other external tools to determine structural and semantic information from word sequences, the relation extraction system can jointly infer the structural and semantic information from word sequences and predict relationships between entities mentioned in the word sequences. Specifically, the relation extraction system can improve the accuracy and flexibility of a relation extraction process by utilizing two views (e.g., separate structural and semantic branches). By utilizing separate structural and semantic views to extract relationships, the relation extraction system can improve the accuracy of structural/semantic information according to the context of the specific word sequence, which can also improve the accuracy of a relationship extracted for entities in a word sequence.

Furthermore, by utilizing a plurality of neural networks with a plurality of training and control mechanisms to enforce structural and semantic consistency between the two views (e.g., between the neural networks), the relation extraction system can provide additional accuracy and flexibility improvements to computing systems that extract relationships between entities in word sequences. In contrast to existing information extraction systems, which are limited to specific knowledge domains or languages, the relation extraction system can provide accurate multi-view relation extraction across a plurality of knowledge domains. In particular, the training and control mechanisms that enforce consistency across the structural and semantic views can provide adaptability of the relation extraction system across different knowledge domains and languages.

Turning now to the figures, FIG. 1 illustrates a schematic diagram of a system environment 100 in which a multi-view relation extraction system 102 (or "relation extraction system 102") can operate. In particular, the system environment 100 includes server device(s) 104 and a client device 106 in communication via a network 108. Moreover, as shown, the server device(s) 104 include a document management system 110, which includes the relation extraction system 102. Furthermore, the relation extraction system 102 includes neural networks 112. Additionally, the client device 106 can include a client application 114.

As shown in FIG. 1, the server device(s) 104 includes or hosts the document management system 110. In one or more embodiments, the document management system 110 includes, or is part of, one or more systems that implement the management of digital content items for storing, creating, modifying, or displaying digital content items for one or more users of the document management system. For example, the document management system 110 provides tools for viewing, generating, editing, or otherwise interacting with digital content items. To illustrate, the document management system 110 provides tools for generating or editing digital content items with text, images, or other media to the client device 106 via the client application 114. In some embodiments, the document management system 110 provides a remote graphical user interface to the client device 106 for a user to interact with digital content items via the client application 114 on the client device 106.

Furthermore, in one or more embodiments, the document management system 110 extracts data from digital content items, such as documents that include text. To illustrate, the document management system 110 extracts information from documents created or hosted via the document management system 110. For example, the document management system 110 includes text documents related to one or more knowledge domains. Alternatively, the document management system 110 can extract information from an external document repository that stores digital documents. For example, the document management system 110 communicates with the document repository via the network 108 to obtain documents and then extract data from the documents.

As mentioned, the document management system 110 includes the relation extraction system 102 to extract relations between entities from documents that include text. Specifically, the relation extraction system 102 utilizes the neural networks 112 to identify entities within text and then determine relationships between the entities. In one or more embodiments, an entity refers to a portion of speech or writing including a noun. For example, an entity includes one or more words that refer to a noun within a sentence/ text. To illustrate, an entity includes, but is not limited to, a name, an object, or a location. Additionally, the relation extraction system 102 includes a plurality of neural networks to extract information via different views of the documents. In one or more embodiments, the relation extraction system 102 includes a first view (e.g., a structural view) for extracting structural information from documents and a second view (e.g., a semantic view) for extracting semantic information from the documents. More specifically, each view of the relation extraction system 102 includes one or more neural networks for extracting structural or semantic information from the documents.

In addition, the relation extraction system 102 utilizes the structural and semantic information to extract the relationships between entities in the text. In one or more embodiments, a relationship includes a connection between two or more entities within text. For example, a relationship between a first entity and a second entity includes a description or classification of how the first entity relates to the second entity. In a specific example, a relationship between a person and a location can include a classification that the person lives at the location. In additional embodiments, a relationship includes a connection between more than two entities.

In one or more additional embodiments, the relation extraction system 102 utilizes a plurality of constraints to enforce consistency between the two views. For example, the relation extraction system 102 utilizes a mutual information constraint to retain semantic consistency between the structural view and the semantic view. Additionally, in one or more embodiments, the relation extraction system 102 utilizes a control mechanism to retain semantic content between a plurality of neural networks in the semantic view. Furthermore, in one or more embodiments, the relation extraction system 102 utilizes a Kullback-Leibler divergence (or "KL divergence") constraint to retain structural consistency between the structural view and the semantic view. Accordingly, the relation extraction system 102 promotes semantic and structural consistency between the plurality of neural networks across the two views.

In one or more embodiments, the relation extraction system 102 extracts relationships for use in one or more additional processes. In some embodiments, the document management system 110 includes additional systems for performing one or more natural language processing operations. For example, the document management system 110 includes one or more systems for performing downstream natural language processing of documents to generate databases of question-answer pairs or populate databases of various knowledge domains. Additionally, in one or more embodiments, the relation extraction system 102 provides relation extraction for natural language processing in generating or recommending tutorials or instructions for specific tasks or applications. Similarly, the relation extraction system 102 can provide relation extraction in one or more dialog systems (e.g., such us a digital image editing dialogue for modifying digital images based on verbal instructions). Additionally, the document management system 110 can provide results of analyzed documents to one or more client devices (e.g., the client device 106) via one or more applications (e.g., the client application 114).

In one or more embodiments, the neural networks 112 include computer representations that are tuned (e.g., trained) based on inputs to approximate unknown functions. In particular, a neural network includes one or more layers (i.e., artificial neurons) that utilize algorithms to learn from, and make predictions on, known data by analyzing the known data to learn to generate outputs that reflect patterns and attributes of the known data. For example, a neural network makes high-level abstractions in data by generating data-driven predictions or decisions from the known input data. In some embodiments, a neural network includes, but is not limited to, a long short-term memory neural network (e.g., a bidirectional long short-term memory neural network or a ranked neurons long short-term memory neural network), a feed forward neural network, a convolutional neural network, a recurrent neural network, or an adversarial neural network. In one or more additional embodiments, a self-attention neural network includes a long short-term memory neural network followed by a self-attention layer.

In addition, as shown in FIG. 1, the system environment 100 includes the client device 106. The client device 106 can include, but is not limited to, a mobile device (e.g., smartphone or tablet), a laptop, a desktop, including those explained below with reference to FIG. 7. Furthermore, although not shown in FIG. 1, the client device 106 can be operated by a user (e.g., a user included in, or associated with, the system environment 100) to perform a variety of functions. In particular, in one or more embodiments, the client device 106 performs functions, such as, but not limited to, accessing, viewing, and interacting with a variety of digital content (e.g., via the client application 114). Additionally, the client device 106 also performs functions for generating, capturing, or accessing data to provide to the document management system 110 via the network 108. In one or more embodiments, the relation extraction system 102 analyzes documents obtained from the client device 106 or associated with documents from the client device 106 to extract relationships between entities mentioned in the documents. Although FIG. 1 illustrates the system environment 100 with a single client device 106, the system environment 100 alternatively includes a different number of client devices.

In one or more embodiments, the server device(s) 104 include a variety of computing devices, including those described below with reference to FIG. 7. For example, the server device(s) 104 includes one or more servers for storing and processing data associated with digital content items (e.g., documents including text). The server device(s) 104 can also include a plurality of computing devices in communication with each other, such as in a distributed storage environment. In some embodiments, the server device(s) 104 comprise a content server. In one or more embodiments, the server device(s) 104 can comprise an application server, a communication server, a web-hosting server, a social networking server, a digital content campaign server, or a digital communication management server.

Additionally, as shown in FIG. 1, the system environment 100 includes the network 108. The network 108 enables communication between components of the system environment 100. In one or more embodiments, the network 108 includes the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 7.

Although FIG. 1 illustrates the server device(s) 104 and the client device 106 communicating via the network 108, the various components of the system environment 100 alternatively communicate and/or interact via other methods (e.g., the server device(s) 104 and the client device 106 communicate directly). Furthermore, although FIG. 1 illustrates the relation extraction system 102 being implemented by a particular component and/or device within the system environment 100, the relation extraction system 102 can be implemented, in whole or in part, by other computing devices and/or components in the system environment 100 (e.g., via the client device 106).

Figure 2:
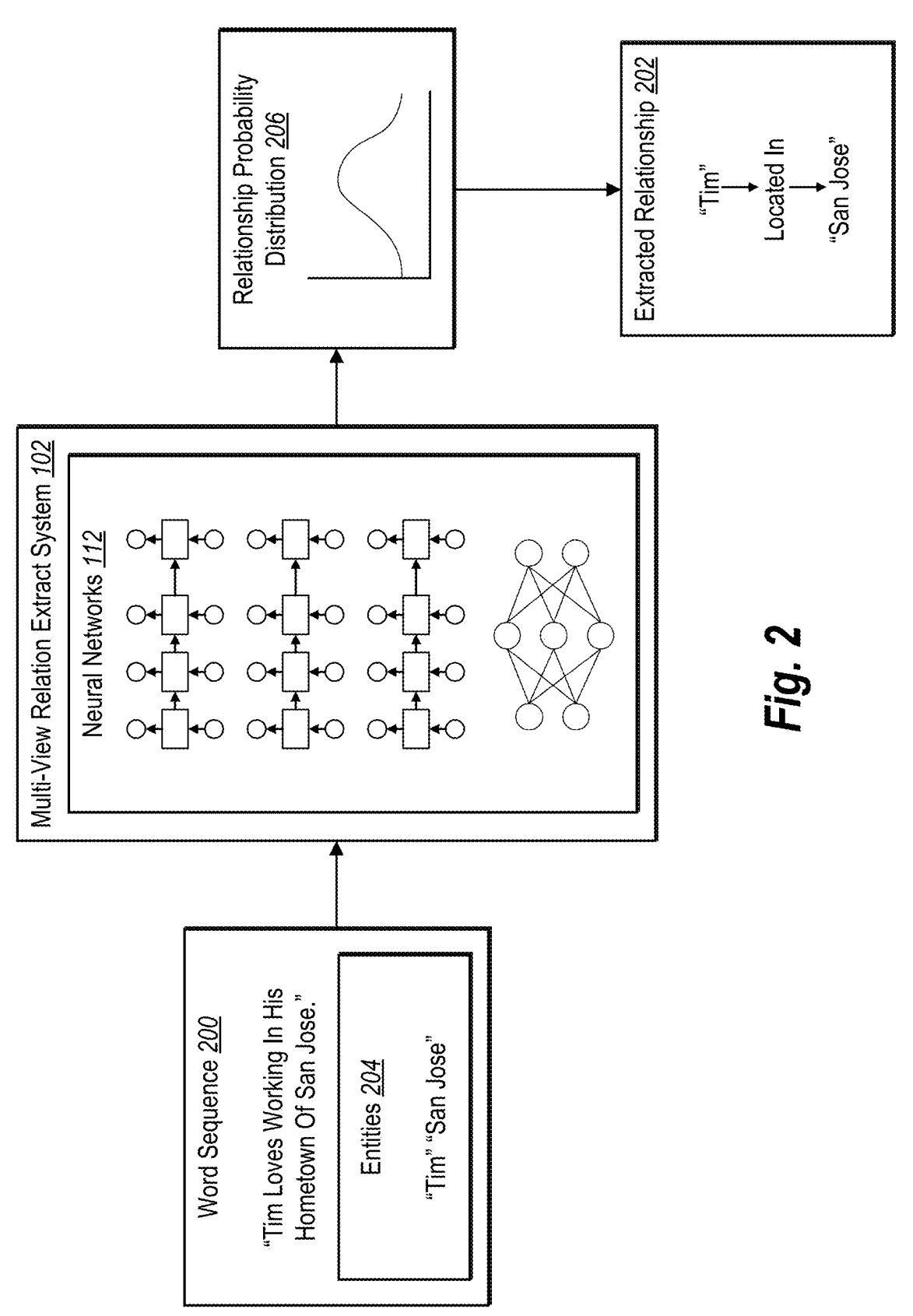
FIG. 2 illustrates a diagram of extracting a relationship between entities in a word sequence in accordance with one or more implementations.

As mentioned above, the relation extraction system 102 accurately and flexibly extracts relationships between entities mentioned in text by utilizing a plurality of neural networks in a multi-view relation extraction process. FIG. 2 illustrates an example of the multi-view relation extraction system 102 analyzing a word sequence 200 utilizing neural networks 112 to determine an extracted relationship 202. In particular, FIG. 2 illustrates that the relation extraction system 102 receives the word sequence 200 as an input to the neural networks 112 to use in generating the extracted relationship based on an output of the neural networks 112.

In one or more embodiments, the word sequence 200 (or "sequence of words") includes ordered words. For example, a sequence of words can include words in a document arranged in an order to convey a specific meaning. To illustrate, a sequence of words includes one or more words arranged in a sentence. In other embodiments, a sequence of words includes more than one sentence. Furthermore, in one or more embodiments, a word includes a string of characters defining an element of speech or writing. Additionally, in one or more embodiments, a sentence is a string one or more words separated from other words by punctuation or spaces in speech or writing.

FIG. 2 illustrates that the relation extraction system 102 analyzes the word sequence 200 to determine entities 204. For instance, the relation extraction system 102 utilizes language processing to determine that the word sequence 200 includes at least two different mentions of entities. For instance, the word sequence 200 includes at least one word that corresponds to (e.g., describes) a first entity and at least one word that corresponds to a second entity. In some embodiments, an entity is described using a plurality of words (e.g., certain proper nouns, such as "San Jose," or nouns with modifiers). To illustrate, the word sequence 200 can include a plurality of words that correspond to the first entity and/or a plurality of words that correspond to the second entity.

In one or more additional embodiments, the relation extraction system 102 processes the word sequence 200 to determine contextual information based on the words and the order of words within the word sequence 200. In particular, the relation extraction system 102 utilizes the neural networks 112 to process the word sequence 200 to determine structural relationships between words in the word sequence 200. For example, the neural networks 112 determine an implied dependency tree based on structural information in the word sequence 200. In at least some embodiments, the neural networks 112 determine the structural information based on grammatical relationships and contextual information associated with words in the word sequence 200.

In some implementations, the relation extraction system 102 utilizes the neural networks 112 to determine semantic information associated with the word sequence 200. For instance, the neural networks 112 determine semantic relationships between words in the word sequence 200. More specifically, the relation extraction system 102 utilizes the neural networks 112 to obtain a semantic understanding of the word sequence 200 and each word within the word sequence 200 based on the semantic relationships between the words.

In response to determining the structural and semantic information for the word sequence 200, the relation extraction system 102 extracts a relationship associated with the entities 204 from the word sequence 200. In particular, the relation extraction system 102 utilizes the neural networks 112 to generate a relationship probability distribution 206 based on the structural and semantic information. For example, the relation extraction system 102 generates the relationship probability distribution to indicate probabilities that a relationship between the entities 204 is a plurality of possible relationships. In one or more embodiments, the plurality of possible relationships includes possible relationships based on the words in the word sequence 200. In additional embodiments, the plurality of possible relation-
ships includes possible relationships based on concepts
related to the words in the word sequence 200.

Additionally, in one or more embodiments, the relation
extraction system 102 determines the extracted relationship
202 from the relationship probability distribution 206. For
example, the relation extraction system 102 determines the
extracted relationship 202 as the possible relationship with
the highest probability in the relationship probability distri-
bution 206. In some embodiments, the relation extraction
system 102 determines the extracted relationship 202 based
on a threshold probability such that the extracted relation-
ship 202 corresponds to a possible relationship with a
probability that meets the threshold probability.

Figure 3A:
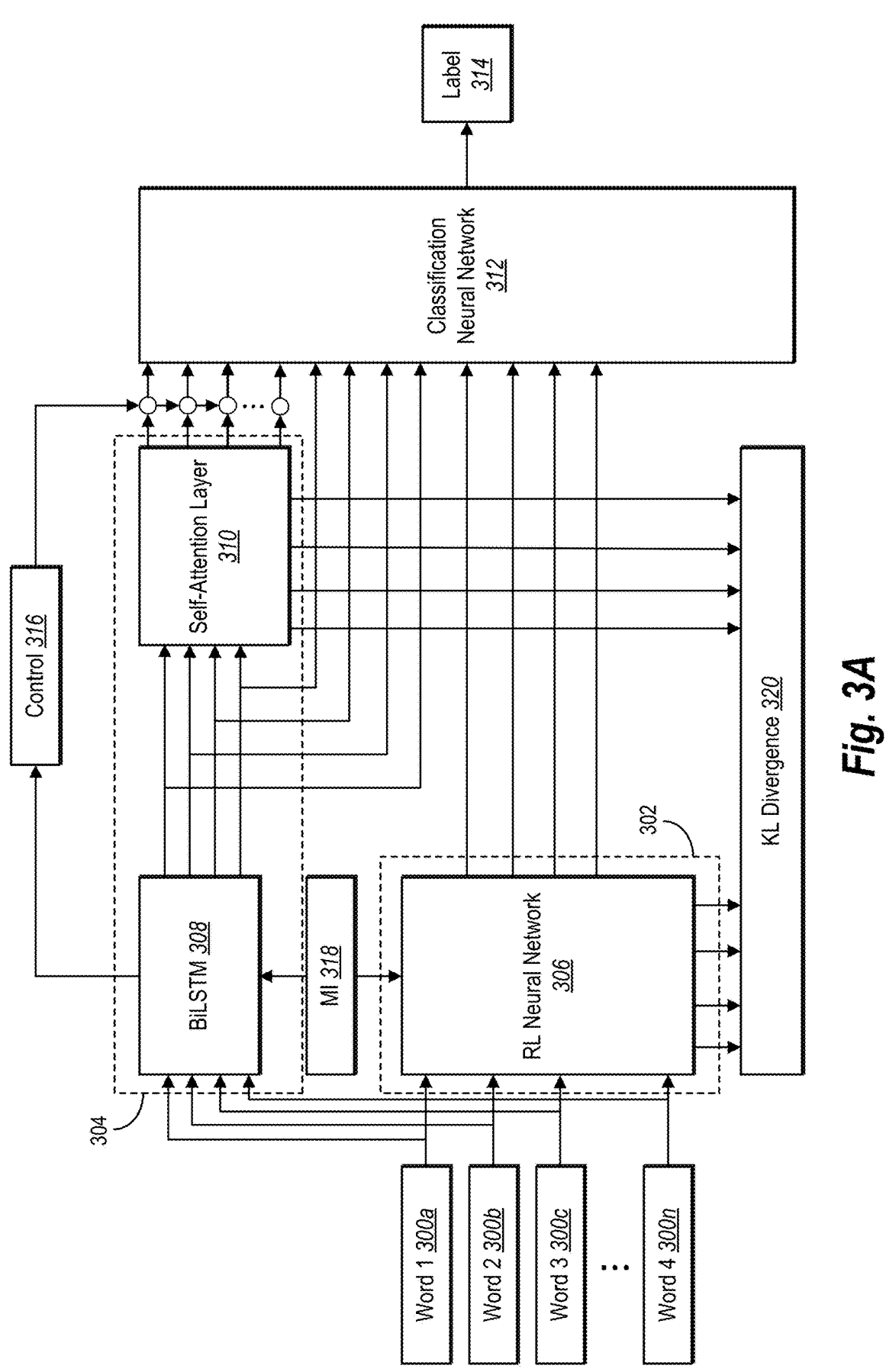
FIGS. 3A-3C illustrate embodiments of neural networks in the multi-view relation extraction system of FIG. 1 in accordance with one or more implementations.
Figure 3B:
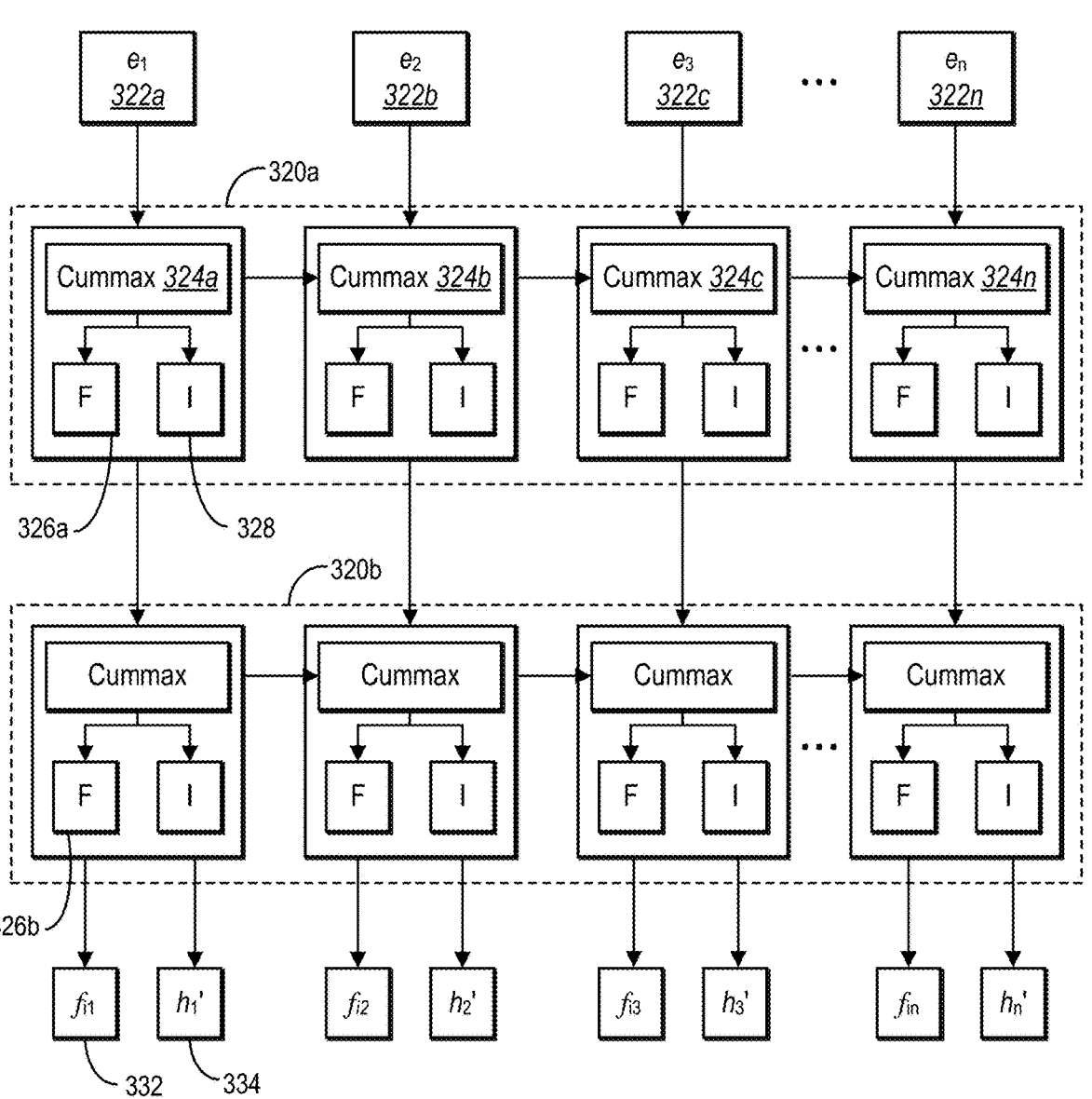
Figure 3C:
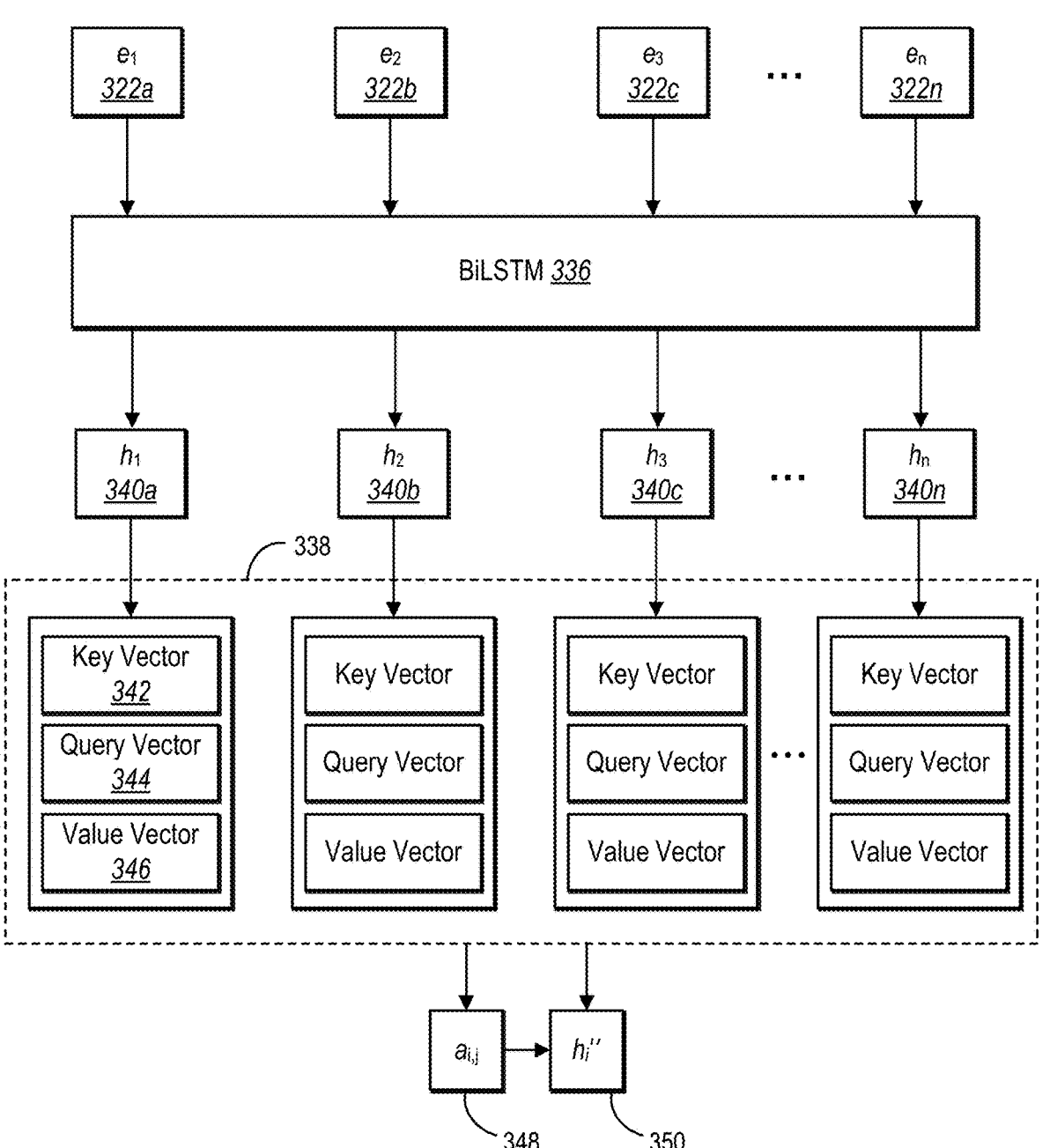

As mentioned, the relation extraction system 102 utilizes
a plurality of neural networks to extract a relationship
between entities mentioned in a word sequence. FIGS.
3A-3C illustrate embodiments of a plurality of neural net-
work configurations for performing a relation extraction
process on a word sequence. Specifically, FIG. 3A illustrates
an embodiment of a plurality of neural networks associated
with a structural view and a semantic view of the relation
extraction system 102 for extracting relationships between
entities from word sequences. FIG. 3B illustrates an embodi-
ment of a ranked long short-term memory neural network in
a structural view of the relation extraction system 102. FIG.
3C illustrates an embodiment of a self-attention neural
network in a semantic view of the relation extraction system
102.

FIG. 3A illustrates that the relation extraction system 102
includes a plurality of neural networks for extracting a
relationship between entities mentioned in a word sequence
including a plurality of words 300a-300n based on structural
and semantic information determined based on two different
views. Specifically, FIG. 3A illustrates that the relation
extraction system 102 includes a structural view 302 for
determining structural information from the word sequence.
Additionally, FIG. 3A illustrates that the relation extraction
system 102 includes a semantic view 304 for determining
semantic information from the word sequence.

FIG. 3A illustrates that the relation extraction system 102
utilizes the words 300a-300n as inputs to the structural view
302 and the semantic view 304. According to one or more
embodiments, the words 300a-300n (or an intermediate
value between the words 300a-300n and the neural net-
works) include initial word representation vectors of words
in the word sequence. In one or more embodiments, a word
representation vector includes a vector that is an abstracted
representation of a word. For example, the relation extrac-
tion system 102 first determines a plurality of embeddings
from the word sequence by creating a vector for each word
that provides an abstract representation of the word. To
illustrate, the relation extraction system 102 generates at
least one embedding for each word in the word sequence.
Thus, in one or more embodiments, a word representation
vector includes an embedding (e.g., a numerical represen-
tation of a word) or a combined embedding (e.g., a concat-
enation of embeddings).

In some embodiments, the relation extraction system 102
generates a pre-trained word embedding, a position embed-
ding indicating a position of a word (e.g., an entity) within
the word sequence, and/or an entity type embedding indi-
cating the entity type of each entity within the word
sequence. Furthermore, in at least some embodiments, the
relation extraction system 102 generates a combined embed-
ding for each word by combining two or more embeddings
for each word into a single vector. For instance, the relation extraction system 102 concatenates a pre-trained word
embedding, a position embedding, and an entity type
embedding into a single concatenation vector.

In one or more embodiments, as illustrated in FIG. 3A, the
structural view 302 includes a ranked neurons long short-
term memory neural network 306 (or simply "RL neural
network 306"). In one or more embodiments, the RL neural
network 306 includes an extended version of a long short-
term memory neural network that determines structural
information for the word sequence based on an importance
of each word in the word sequence. For example, the RL
neural network 306 induces a structure for the word
sequence by generating an importance score for each of the
words 300a-300n.

In one or more embodiments, an importance score indi-
cates a proximity of a given word to a root of a tree structure
(e.g., an implied tree structure) of a sequence of words. In
one or more embodiments, a tree structure includes a digital
data structure with a plurality of nodes representing a
hierarchy of words within a word sequence. To illustrate, a
tree structure includes a word dependency tree including
word dependencies inferred based on importance scores
associated with the words. For example, a word with a
highest importance score indicates that the corresponding
word corresponds to a root node in an induced/implied
dependency tree for a word sequence including the word.
Additionally, in one or more embodiments, a structural
importance score includes a value that indicates an impor-
tance score generated by the RL neural network 306 in
connection with structural information of the word sequence
(e.g., in the structural view 302). Furthermore, in one or
more embodiments, a semantic importance score includes a
value that indicates an importance score generated by a
self-attention neural network in connection with semantic
information of a word sequence (e.g., in the semantic view
304, as described below).

In one or more embodiments, the relation extraction
system 102 also utilizes the RL neural network 306 to
generate a set of encoded word representation vectors for the
words 300a-300n. In one or more embodiments, an encoded
word representation vector includes a word representation
vector that is further encoded (e.g., abstracted) via a neural
network. For example, an encoded word representation
vector includes a hidden vector generated by a neural
network based on a word representation vector input to the
neural network. More specifically, the RL neural network
306 processes word representation vectors (e.g., concatena-
tion vectors of embeddings) associated with the words
300a-300n to first generate the structural importance scores.
The RL neural network 306 then utilizes the importance
scores to generate encoded word representation vectors as a
set of hidden vectors. For example, the RL neural network
306 includes an additional set of master gates relative to an
LSTM architecture (e.g., forget gates and input gates) to
generate the structural importance scores and then the
encoded word representation vectors. Furthermore, the RL
neural network 306 utilizes a cummax activation function to
rank the neurons in the master gates.

In addition to generating a set of encoded word represen-
tation vectors for the words 300a-300n by utilizing the RL
neural network 306 in the structural view 302, the relation
extraction system also utilizes the semantic view 304 to
generate additional sets of encoded word representation
vectors. Specifically, FIG. 3A illustrates that the semantic
view 304 includes a self-attention neural network, which
includes a bidirectional long short-term memory neural
network 308 (or simply "BiLSTM 308") and a self-attention layer 310. In one or more embodiments, the self-attention neural network determines semantic information for the word sequence. The relation extraction system 102 thus utilizes the semantic view 304 to determine a semantic structure of the words 300*a*-300*n* in the word sequence by generating semantic connection scores indicating semantic relationships between the words 300*a*-300*n*.

In at least some embodiments, the relation extraction system 102 utilizes the self-attention neural network of the semantic view 304 to generate two sets of encoded word representation vectors. For instance, the relation extraction system 102 generates a first set of encoded word representation vectors by utilizing the BiLSTM 308 to process the word representation vectors associated with the words 300*a*-300*n*. To illustrate, the BiLSTM 308 generates a sequence of hidden vectors based on the word representation vectors.

In one or more embodiments, the relation extraction system 102 utilizes the self-attention layer 210 to generate a second set of encoded word representation vectors. More specifically, the relation extraction system 102 utilizes the self-attention layer 210 to process the set of encoded word representation vectors generated (e.g., the hidden vectors) generated by the BiLSTM 308 (or a different BiLSTM) to generate a set of vectors for each word. The self-attention layer 210 then outputs a plurality of vectors that the relation extraction system 102 utilizes to generate a new sequence of hidden vectors corresponding to the word sequence. In one or more embodiments, the relation extraction system 102 determines the second set of encoded word representation vectors from the new sequence of hidden vectors based on the output of the self-attention layer 310 (e.g., the second set includes the new sequence of hidden vectors).

After generating a plurality of sets of encoded word representation vectors via the structural view 306 and the semantic view 308, FIG. 3A illustrates that the relation extraction system 102 utilizes a classification neural network 312 to generate a label 314 indicating a relationship between entities in the word sequence. In particular, the relation extraction system 102 provides a set of encoded word representation vectors from the RL neural network 306, a set of encoded word representation vectors from the BiLSTM 308, and a set of encoded word representation vectors from the self-attention layer 310 to the classification neural network 312. In one or more embodiments, the relation extraction system 102 combines the sets of encoded word representation vectors into an overall word representation vector. In some embodiments, the overall word representation vector also includes specific encoded word representation vectors corresponding to the entities mentioned in the word sequence.

The relation extraction system 102 then utilizes the classification neural network 312 to generate the label 314 based on the overall representation vector. For instance, as previously mentioned, the relation extraction system 102 generates a relationship probability distribution. In one or more embodiments, the relation extraction system 102 utilizes the classification neural network 312 to generate the relationship probability distribution from the overall representation vector. Additionally, the relation extraction system 102 generates the label 314 based on the relationship probability distribution. For example, as mentioned previously, the relation extraction system 102 generates the label 314 by selecting a possible relationship with a highest probability in the relationship probability distribution.

In one or more embodiments, the relation extraction system 102 also utilizes a plurality of constraints to provide consistency between the neural networks and between the views in the relation extraction process. For example, FIG. 3A illustrates that the relation extraction system 102 includes a control mechanism ("control 316") associated with the semantic view 304. In particular, the relation extraction system 102 utilizes the control 316 to provide semantic consistency between the encoded word representation vectors generated by the BiLSTM 308 and the encoded word representation vectors generated by the self-attention layer 310. As illustrated in FIG. 3A, the control 316 connects an output (e.g., a control vector) of the BiLSTM 308 to outputs of the self-attention layer 310.

In one or more additional embodiments, the relation extraction system 102 utilizes a mutual information constraint ("MI 318") in connection with the RL neural network 306. FIG. 3A illustrates that the relation extraction system 102 determines mutual information between the BiLSTM 308 and the RL neural network 306. In one or more embodiments, an estimated mutual information metric indicates a predicted measurement (e.g., utilizing a neural network such as an adversarial neural network) of mutual information between two components (e.g., the BiLSTM 308 and the RL neural network 306). For example, the relation extraction system 102 determines the estimated mutual information metric for semantic representations from the BiLSTM 308 and the RL neural network 306. Additionally, the relation extraction system 102 improves the performance of the structural view 302 and the semantic view 304 by increasing the mutual information between the encoded word representation vectors generated by the BiLSTM 308 and the encoded word representation vectors generated by the RL neural network 306. Increased mutual information provides increased semantic consistency between the structural view 302 and the semantic view 304.

Furthermore, in one or more embodiments, the relation extraction system 102 utilizes a Kullback-Leibler divergence constraint ("KL divergence 320") to further provide consistency between the structural view 302 and the semantic view 304. To illustrate, the relation extraction system 102 compares a structural importance generated by the structural view 302 and a semantic importance generated by the semantic view 304. For example, the relation extraction system 102 utilizes the KL divergence 320 to minimize a difference between distributions associated with the structural importance and the semantic importance. More specifically, the structural importance is based on structural importance scores generated by the RL neural network 306 (as previously mentioned) and the semantic importance is based on semantic importance scores generated via the self-attention layer 310. Thus, the relation extraction system 102 utilizes the KL divergence 320 to enforce structural consistency between the structural view 302 and the semantic view 304.

In one or more embodiments, the relation extraction system 102 utilizes one or more of the constraints during the relation extraction process. In one or more additional embodiments, the relation extraction system 102 utilizes one or more of the constraints during a training process associated with learning parameters of one or more of the neural networks in the relation extraction system 102 (e.g., as described in relation to FIGS. 4A-4D). For example, the relation extraction system 102 utilizes the control 316 to enforce semantic consistency within the semantic view 304 during the relation extraction process. In one or more additional embodiments, the relation extraction system 102 utilizes the MI 318 and the KL divergence 320 during a training process for learning parameters of the neural networks. In some embodiments, the relation extraction system

102 also utilizes a classification loss associated with predicting the label 314 (e.g., in connection with the classification neural network 312) to train the neural networks.

As mentioned, FIG. 3B illustrates an embodiment of a ranked neurons long short-term memory neural network (e.g., the RL neural network 306). In one or more embodiments, the RL neural network includes two layers of a ranked neurons long short-term memory neural network. In particular, FIG. 3B illustrates a first layer 320a and a second layer 320b. For example, the first layer 320a receives a plurality of word representation vectors 322a-322n corresponding to the words 300a-300n illustrated in FIG. 3A. For example, the word representation vectors 322a-322n include combined vectors of embeddings associated with the corresponding words. Additionally, the second layer 320b receives outputs from the first layer 320a. In one or more alternative embodiments, the RL neural network includes one or more additional layers prior to the first layer 320a such as a long short-term memory neural network layer (e.g., a bidirectional long short-term memory neural network layer).

In one or more embodiments, each layer of the RL neural network includes a plurality of steps (or cells) 324a-324n corresponding to a plurality of words in a word sequence being processed by the RL neural network. For instance, if a word sequence has 15 words, the relation extraction system 102 generates 15 word representation vectors (e.g., based on 15 different sets of embeddings for the words). Accordingly, each layer of the RL neural network includes 15 steps (or cells) for receiving and processing the word representation vectors.

Additionally, as illustrated in FIG. 3B, each step of each layer in the RL neural network includes an additional set of master gates (relative to an LSTM architecture). More specifically, each step includes an additional forget gate and an additional input gate. For example, FIG. 3B illustrates that a first step 324a in the first layer 320a includes a forget gate 326a and an input gate 328. Additionally, each step includes a cummax activation function (or "cummax") for computing hidden vectors of the forget gate and input gate. To illustrate, the first step 324a of the first layer 320a includes a cummax 330a to generate hidden vectors for the forget gate 326a and the input gate 328 of the first step 324a. The cummax activation functions allow the relation extraction system 102 to provide a ranking mechanism for neurons on the master gates of the RL neural network.

In one or more embodiments, a forget gate includes a neural network component that causes a neural network cell to "forget" (e.g., not retain) specific information and/or to "remember" (e.g., retain) other information. Accordingly, a forget gate causes a neural network to retain information from one cell state to another cell state. By causing a neural network to remember or forget specific information, the forget gate influences the impact that certain information from an input sequence has on an output.

In one or more embodiments, the relation extraction system 102 configures the RL neural network such that input values to the cummax function at each step involve a hidden vector from a previous step and an input vector for a current step. For example, FIG. 3B illustrates that the cummax 330a of the first step 324a includes an input vector including a first word representation vector 322a. Because the first step 324a does not have any previous steps, the cummax 330a only receives a single vector. The cummax 330b for a second step 324b after the first step 324a, however, receives an input vector including a second word representation vector 322b and a hidden vector from the first step 324a. The cummax

330b for the second step 324b thus determines the hidden vectors for master gates of the second step 324b based on the second word representation vector 322b and the hidden vector from the previous step (the first step 324a).

After processing the word representation vectors 322a-322n via the first layer 320a, the relation extraction system 102 utilizes the second layer 320b to generate a set of encoded word representation vectors. In one or more embodiments, the second layer 320b includes a plurality of steps corresponding to the plurality of steps in the first layer 320a. Additionally, each step includes a cummax activation function that computes hidden vectors for additional master gates within each step. Accordingly, rather than receiving the word representation vectors 322a-322n as inputs to the cummax activation functions in the second layer 320b, the steps in the second layer 320b receive outputs (e.g., hidden vectors) from the steps in the first layer 320a. Furthermore, each successive step utilizes the cummax activation function to compute the hidden vectors for the additional master gates based on hidden vectors for the current step (e.g., from the corresponding step in the first layer 320a) and a previous step.

In one or more embodiments, the relation extraction system 102 utilizes the RL neural network to generate structural importance scores based on the word representation vectors 322a-322n. For instance, the relation extraction system 102 determines a structural importance score 332 for the first word representation vector 322a by utilizing a forget gate 326b and the corresponding step in the second layer 320b. More specifically, the relation extraction system 102 obtains a hidden vector of the forget gate 326b at the second layer 320b for the first word representation vector 322a. The relation extraction system 102 then generates the structural importance score 332 for the first word representation vector 322a based on the hidden vector of the forget gate 326b.

Additionally, in one or more embodiments, the relation extraction system 102 generates a set of encoded word representation vectors for providing to a classification neural network (e.g., the classification neural network 312 of FIG. 3A). For example, the relation extraction system 102 determines the set of encoded word representation vectors based on an output of the second layer 320b. In some embodiments, the relation extraction system 102 determines each encoded word representation vector as a hidden vector generated by a corresponding step in the second layer 320b. To illustrate, the relation extraction system 102 determines a first encoded word representation vector 334 for the first word representation vector 322a as a hidden vector generated at the corresponding step in the second layer 320b. Accordingly, the set of encoded word representation vectors includes a hidden vector for each step in the second layer 320b of the RL neural network.

According to one or more embodiments, the relation extraction system 102 induces a structure in a structural view by assigning an importance score $$w_i^{RL}$$

for every word $w_i$ in an input sequence W, which implicitly forms a binary tree structure for W. Words with higher importance scores are closer to the root of the tree structure, thereby reflecting the levels of the words within the tree structure. Consequently, the word $w_{i*}$ with the highest score $$w_{i*}^s$$

is considered the root node, from which the relation extraction system 102 constructs two subtrees recursively based on the words before $w_{i*}$ for a left child and words after $w_{i*}$ for a right child.

As mentioned, the RL neural network includes additional master gates (e.g., a forget gate and an input gate) as compared to a traditional long short-term memory neural network. In one or more embodiments, by including the additional master gates in the RL neural network, the relation extraction system 102 utilizes the RL neural network to enforce a hierarchy for neurons/dimensions in hidden vectors. For example, the relation extraction system 102 only allows each neuron to be activated for a subset of words in the word sequence. Accordingly, the relation extraction system 102 encodes long-term information into the structural and semantic information for higher-ranking neurons with a longer lifetime (e.g., activated for more words in the word sequence) while lower-ranking neurons cancel more rapidly to focus on short-term information (e.g., the structural bias).

Furthermore, in one or more embodiments, the relation extraction system 102 utilizes a cummax activation function for computing hidden vectors of the forget and input gates as: cummax(x)=cumsum(softmax(x))[1]. For example, the cummax activation function aggregates the softmax output of an input vector x along the dimensions that are seen as the expectation of some binary vector of the form (0, . . . , 0, 1, . . . , 1) (i.e., divided into two consecutive segments—the 0-segment and the 1-segment). Additionally, the input to the cummax activation function to compute the gate vectors for the RL neural network at the current step also involves the hidden vector from the previous step and the input vector for the current step. At a given step, the 1-segments of the hidden vectors of the master gates cover the neurons that are activated for the gates at that step.

Additionally, the relation extraction system 102 utilizes the lengths of the 1-segments (e.g., the sum of weights of the neurons in the 1-segments of the gate vectors for a word) to determine the importance of the corresponding word in the word sequence (e.g., based on the hidden vector of the master forget gate). To illustrate, for $f_i=f_{i1}, f_{i2}, \ldots, f_{iD}$ representing the hidden vector for the master forget gate at the i-th word $w_i \in W$ from the RL neural network and D representing the dimension of the hidden vector, the importance score $$w_i^{RL}$$

for $w_i$ is determined by:

$$w_i^{RL} = D - \sum_{j=1\ldots D} f_{ij}.$$

Additionally, based on the sequence of word representation vectors E=$e_1$, $e_1$, . . . , $e_N$ input into the RL neural network, the relation extraction system 102 uses the master forget gates of a second layer of the RL neural network to generate the importance scores $$w_i^{RL}$$

for the words in W, which serve as the encoding of the tree structure induced by the RL neural network. Additionally, the hidden vectors produced by the second layer are represented as $$H' = h_1', h_2', \ldots, h_N'.$$

The relation extraction system 102 can utilize a variety of specific architectures to implement an RL neural network. For example, in some embodiments, the relation extraction system 102 utilizes an RL neural network as described by Yikang Shen, Shawn Tan, Alessandro Sordoni, and Aaron Courville in "Ordered neurons: integrating tree structures into recurrent neural networks" in ICLR 2019, which is herein incorporated by reference in its entirety.

Additionally, as mentioned, FIG. 3C illustrates an embodiment of a self-attention neural network (e.g., corresponding to the semantic view 304 of FIG. 3A). In one or more embodiments, the self-attention neural network includes a plurality of neural networks and/or neural network layers. For example, FIG. 3C illustrates that the self-attention neural network includes a bidirectional long short-term memory neural network ("BiLSTM 336") and a self-attention layer 338.

According to one or more embodiments, the BiLSTM 336 receives, as input, the word representation vectors 322a-322n. The BiLSTM 336 processes the word representation vectors 322a-322n to generate a sequence of hidden vectors 340a-340n. As previously described, the relation extraction system 102 can utilize the sequence of hidden vectors 340a-340n generated by the BiLSTM 336 as a set of encoded word representation vectors input to the classification neural network 312 of FIG. 3A. For example, the BiLSTM 336 encodes semantic information from the word sequence (e.g., the semantic information of the word sequence as a whole) into the encoded word representation vectors.

Additionally, the relation extraction system 102 uses the hidden vectors 340a-340n generated by the BiLSTM 336 as the inputs to the self-attention layer 338. Specifically, the self-attention layer 338 processes the hidden vectors 340a-340n to generate a plurality of vectors for each word in the word sequence. For example, FIG. 3C illustrates that the self-attention layer 338 consumes the hidden vectors 340a-340n to generate a key vector, a query vector, and a value vector for each hidden vector. To illustrate, the self-attention layer 338 generates a key vector 342, a query vector 344, and a value vector 346 corresponding to a first hidden vector 340a. In one or more embodiments, the self-attention layer 338 generates the vectors utilizing weight matrices associated with the different types of vectors.

In one or more embodiments, the self-attention layer 338 includes a neural network component that generates values that focus the neural network on one or more features. In particular, the self-attention layer 338 generates values that focus on a subset of inputs or features based on one or more hidden states. For example, a self-attention mechanism generates attention weights (or an attention mask) to emphasize or focus on some features relative to other features reflected in a latent feature vector. Thus, in one or more embodiments, the relation extraction system 102 trains the self-attention layer 338 to control access to memory for storing, emphasizing, or accessing certain features to more accurately learn the context of a given input. Additionally, in one or more embodiments, the key vector 342, the query vector 344, and the value vector 346 represent a set of keys, queries, and values, respectively, packed into a matrix, in which a value represents the dimension of each of the queries and keys.

Additionally, in one or more embodiments, the relation extraction system 102 generates semantic connection scores 348 based on the vectors generated by the self-attention layer 338. For example, the self-attention layer 338 (or another layer within the self-attention neural network) generates the semantic connection scores 348 based on the key vectors and query vectors for the hidden vectors. To illustrate, the relation extraction system 102 determines a semantic connection score for a pair of hidden vectors (e.g., for a pair of words in the word sequence) based on a key vector for a first hidden vector and a query vector for a second hidden vector. Accordingly, the relation extraction system 102 determines semantic connection scores for each combination of two hidden vectors from the hidden vectors 340a-340n.

In one or more embodiments, a semantic connection score includes a value that indicates a semantic link or semantic connection between two words within a sequence of words. Furthermore, in one or more embodiments, a semantic connection includes a semantic relationship between two or more words or concepts within a word sequence based on word meanings and context of the word sequence. For example, a higher semantic connection score indicates a more significant semantic connection score between two words than a lower semantic connection score. In one or more embodiments, a plurality of semantic connection scores for a plurality of pair of words in a word sequence, thereby inducing a semantic graph structure for the word sequence.

For instance, a semantic graph structure includes a graph of connected nodes in which each node corresponds to a word in a word sequence. Furthermore, a semantic graph structure includes links between each node with values based on semantic connection scores, in which a strength of each link corresponds to a semantic connection score for the corresponding words. To illustrate, the semantic graph structure includes a fully-connected semantic graph structure that connects each word in the word sequence to every other word in the word sequence.

In one or more embodiments, the relation extraction system 102 utilizes the vectors generated by the self-attention layer 338 (e.g., the key vector, the query vector, and the value vector) to generate a plurality of hidden vectors 350. For instance, the relation extraction system 102 generates the hidden vectors 350 corresponding to the words in the word sequence by combining the semantic connection scores 348 and the value vectors. Accordingly, the relation extraction system 102 takes into consideration the semantic connections between the words in the word sequence when utilizing the self-attention layer 338 to generate the hidden vectors 350. The relation extraction system 102 thus generates the hidden vectors 350 to encode richer context information for the word sequence while highlighting the induced graph structure information.

As briefly mentioned previously, in one or more embodiments, the relation extraction system 102 utilizes a control mechanism to retain semantic information across the BiLSTM 336 and the self-attention layer 338. For example, the relation extraction system 102 utilizes a control mechanism to enforce semantic constancy between the encoded word representation vectors (e.g., the hidden vectors) generated by the BiLSTM 336 and the self-attention layer 338 and used in determining an overall word representation vector. To illustrate, the relation extraction system 102 selects a control vector from the encoded word representation vectors generated by the BiLSTM 336 to emphasize the encoded word representation vectors of the entities in the word sequence. The relation extraction system 102 applies the control vector directly to the encoded word representation vectors determined using the self-attention layer 338 to obtain a new encoded word representation vector.

In one or more embodiments, the relation extraction system 102 feeds the word representation vectors $E=e_1$, $e_1, \ldots, e_N$ into a bidirectional long short-term memory neural network to produce a sequence of hidden vectors $H=h_1, h_2, \ldots, h_N$. Additionally, the relation extraction system 102 provides H to a self-attention layer to generate, for each hidden vector, a key vector $k_i$, a query vector $q_i$, and a value vector $v_i$ via $k_i=U_k h_i$, $q_i=U_q h_i$, and $v_i=U_v h_i$, in which $U_k$, $U_q$, and $U_v$ are weight matrices. For example, the relation extraction system 102 utilizes a self-attention mechanism as described in U.S. patent application Ser. No. 16/411,490, "UTILIZING DEEP RECURRENT NEURAL NETWORKS WITH LAYER-WISE ATTENTION FOR PUNCTUATION RESTORATION," and U.S. patent application Ser. No. 16/569,513, "UTILIZING A GATED SELF-ATTENTION MEMORY NETWORK MODEL FOR PREDICTING A CANDIDATE ANSWER MATCH TO A QUERY," which are herein incorporated by reference in their entirety. In additional embodiments, the relation extraction system 102 utilizes a self-attention mechanism as described by Ashish Vaswani Noam Shazeer, Niki Parmar, Jakob Uszkoreit, Llion Jones, Aidan N. Gomez, Lukasz Kaiser, and Illia Polosukhin in "Attention is all you need" in NIPS 2017, which is herein incorporated by reference in its entirety.

In one or more embodiments, the relation extraction system 102 generates semantic connection scores $a_{ij}$ between words $w_i$ and $w_j$ by the dot product between $k_1$ and $q_j$: $a_{ij}=\exp(k_i \cdot q_j)/\Sigma_{t=1 \ldots N} \exp(k_i \cdot q_t)$. In one or more embodiments, the relation extraction system 102 also utilizes a normalization factor to generate the semantic connection scores. As previously noted, the semantic connection scores induce a semantic graph structure. Accordingly, the relation extraction system 102 utilizes the semantic connection scores to generate encoded word representation vectors $$H'' = h''_1, h''_2, \ldots, h''_N$$

for words in the sentence using $$h''_i = \sum_{j=1 \ldots n} a_{ij} v_j.$$

Furthermore, the relation extraction system 102 utilizes the semantic connection scores $a_{ij}$ to transform the induced semantic graph structure into a tree structure by determining semantic importance scores. Specifically, the relation extraction system 102 assumes that a word is more important if it has stronger connections with other words by determining the importance score $$w_i^{satt}$$

for the word $w_i$ using:

$$w_i^{satt} = \sum_{j=1}^{N} a_{i,j}/N,$$

in which the weights $a_{i,i}$ are set to zero. Accordingly, the scores $$w_1^{satt}, w_2^{satt}, \dots, w_N^{satt}$$

induce a tree structure learned by the self-attention layer.

In one or more embodiments, the relation extraction system 102 utilizes a plurality of losses to provide structural and semantic consistency within the neural networks and between the structural and semantic views of the relation extraction system 102. FIGS. 4A-4D illustrate a plurality of losses that the relation extraction system 102 utilizes in training a plurality of neural networks. Specifically, FIGS. 4A-4D illustrate the determination of a structure loss, a mutual information loss, a classification loss, and a total loss. In one or more embodiments, the relation extraction system 102 utilizes the losses to jointly learn parameters of the neural networks for accurately labeling relationships between entities mentioned in a word sequence.

Figure 4A:
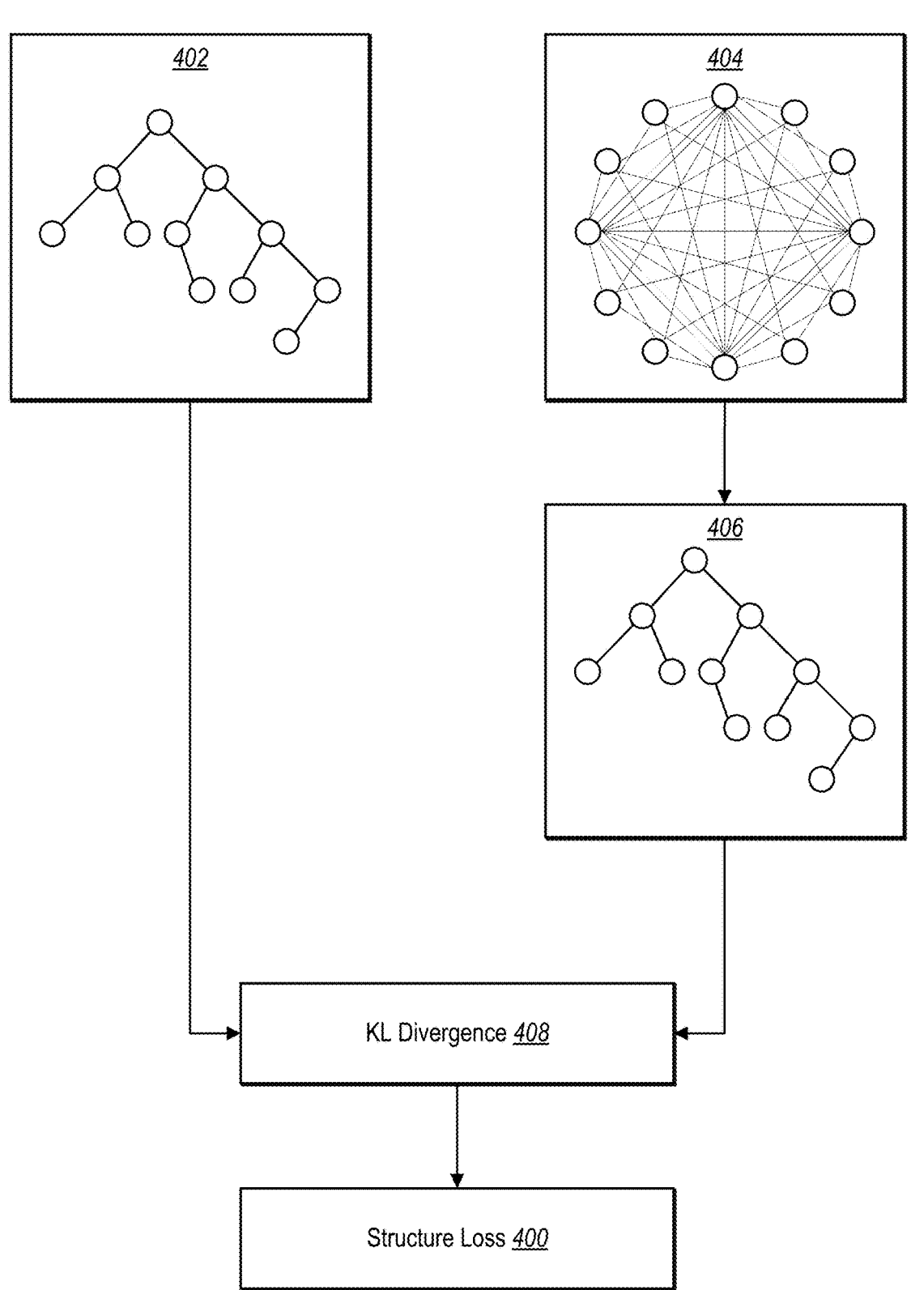
FIGS. 4A-4D illustrate embodiments of losses associated with the multi-view relation extraction system of FIG. 1 in accordance with one or more implementations.

FIG. 4A illustrates that the relation extraction system 102 determines a structure loss 400 based on structural inconsistencies between the structural view and the semantic view of the relation extraction system 102. In one or more embodiments, a structure loss indicates a loss based on a difference in a predicted/inferred structure (e.g., a tree structure) generated by one or more neural networks in a structural view and a predicted/inferred structure generated by one or more neural networks in a semantic view. Accordingly, the structure loss indicates differences in inferred structures from structural importance scores generated by a RL neural network and from semantic importance scores generated by a self-attention neural network.

For example, FIG. 4A illustrates that the structural view generates structural importance scores that induce a first tree structure 402. In particular, as previously noted, the structural importance scores indicate a proximity of words in a word sequence to a root node of the first tree structure 402. Thus, words with higher importance scores are nearer the root node, while words with lower importance scores are farther from the root node of the first tree structure 402.

Furthermore, FIG. 4A illustrates that the semantic view generates semantic connection scores that induce a semantic graph structure 404 that includes a plurality of semantic links between words in the word sequence. In particular, the semantic connection scores indicate the strength of each semantic link between pairs of words in the word sequence. Additionally, FIG. 4A illustrates that the relation extraction system 102 utilizes the semantic graph structure 404 to determine a second tree structure 406 corresponding to the structure of the word sequence based on the semantic information from the word sequence. Specifically, the relation extraction system 102 converts the semantic connection scores into semantic importance scores for the words in the word sequence to determine a binary dependency tree. For example, the relation extraction system 102 combines all of the semantic connection scores (from the semantic graph structure 404) for a particular word to generate a semantic importance score for that word. The relation extraction system can similarly determine semantic importance scores for all of the words. The relation extraction system then utilizes these semantic importance scores to determine the second tree structure 406.

After determining the first tree structure 402 and the second tree structure 406 corresponding to the different views, the relation extraction system 102 determines a KL divergence 408 to determine the difference between the first tree structure 402 and the second tree structure 406. In one or more embodiments, the relation extraction system 102 first determines probability distributions based on the structural importance scores and the semantic importance scores. The relation extraction system 102 then determines the KL divergence 408 for the probability distributions. The relation extraction system 102 incorporates the KL divergence 408 into the structure loss 400 to minimize a distance between the two dependency trees.

In one or more embodiments, the relation extraction system 102 also determines a contribution of each word to the structure of the word sequence. To illustrate, each word in a word sequence can contribute differently to the structure of the word sequence in connection with relation extraction processes, such that more important/relevant words contribute more to the structure than other words. The relation extraction system 102 thus estimates contribution scores for the words based on the hidden vectors generated by a bidirectional long short-term memory neural network and further based on the hidden vectors associated with the entities of the word sequence. The relation extraction system 102 then incorporates the contribution scores into the structure loss 400 with the KL divergence 408.

In one or more embodiments, the relation extraction system 102 first transforms structure importance scores $$w_1^{RL}, w_2^{RL}, \dots, w_N^{RL}$$

and the semantic importance scores $$w_1^{satt}, w_2^{satt}, \dots, w_N^{satt}$$

into probability distributions $W^{RL}$ ("importance probability distribution") and $W^{satt}$ ("structural probability distribution"), respectively, via $$W^{RL} = softmax([w_1^{RL}, w_2^{RL}, \dots, w_N^{RL}]) \text{ and } W^{satt} =$$

$$softmax([w_1^{satt}, w_2^{satt}, \dots, w_N^{satt}]).$$

Additionally, the relation extraction system 102 incorporates the KL divergence between $W^{RL}$ and $W^{satt}$ into a loss function:

$$KL(W^{RL} \| W^{satt}) = -\Sigma_i W_i^{RL} \log \frac{w_i^{RL}}{w_i^{satt}}.$$

Furthermore, as mentioned, the relation extraction system 102 also utilizes a contribution score $s_i$ to weight the contribution of words in the word sequence to the structure based on vectors $h_i$, $h_s$, and $h_o$ of $w_i$ by: $s_i = \sigma(W_1 \sigma(W_2[h_i, h_s, h_o]))$, in which $h_s$ and $h_o$ correspond to hidden vectors of entities in the word sequence, and $W_1$ and $W_2$ are weight matrices. The relation extraction system 102 then utilizes the contribution scores to weight the word-specific terms in the KL divergence in the loss function as:

$$L_{structure} = -\Sigma_i s_i W_i^{RL} \log \frac{w_i^{RL}}{w_i^{satt}}.$$

Figure 4B:
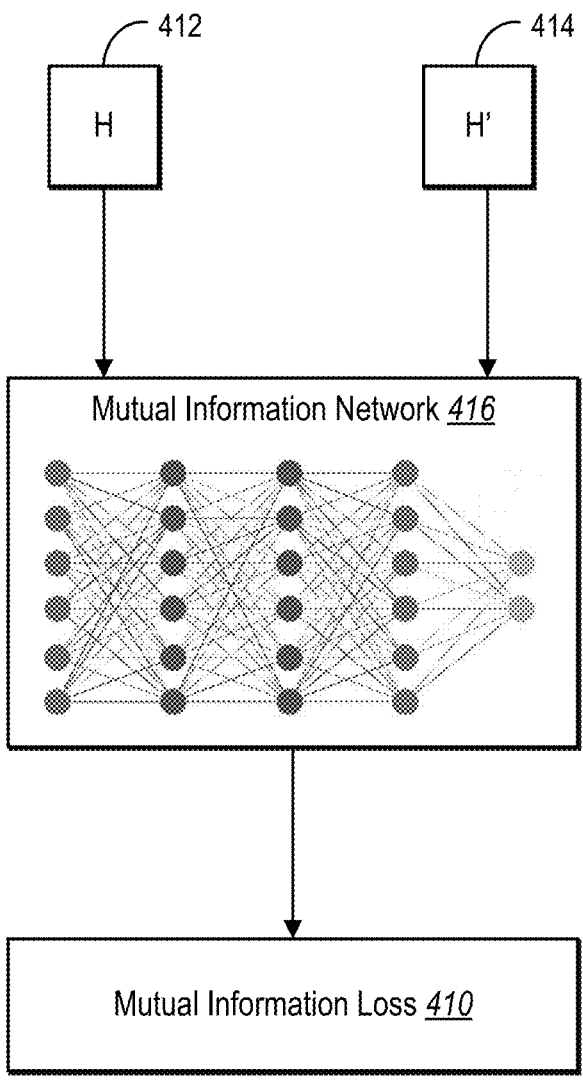

FIG. 4B illustrates that the relation extraction system 102 determines a mutual information loss 410 based on semantic information associated with a ranked neurons long short-term memory neural network and a bidirectional long short-term memory neural network. In one or more embodiments, a mutual information metric indicates how much information is known about a random variable if the value of another variable is revealed. Accordingly, in one or more embodiments, a mutual information loss includes a value based on an estimated mutual information metric generated based on outputs of the bidirectional long short-term memory neural network and the ranked neurons long short-term memory neural network. More specifically, two variables are more dependent with a larger mutual information metric and more independent with less mutual information. Accordingly, if the semantic information between the ranked neurons long short-term memory and the bidirectional long short-term memory neural network is consistent, the mutual information between the two neural networks is large.

In one or more embodiments, the relation extraction system 102 compares a first set of encoded word representation vectors 412 corresponding to a bidirectional long short-term memory neural network in a semantic view and a second set of encoded word representation vectors 414 corresponding to a ranked neurons long short-term memory neural network in a structural view. For example, the relation extraction system 102 utilizes a mutual information network 416 to generate representation vectors based on the first set of encoded word representation vectors 412 and the second set of encoded word representation vectors 414. The relation extraction system 102 then utilizes the mutual information network 416 to estimate a lower bound of mutual information by utilizing a variable discriminator in an adversarial estimation process. In one or more embodiments, a variable discriminator includes a neural network component in an adversarial neural network for differentiating vectors sampled from a plurality of distributions. Furthermore, the relation extraction system 102 incorporates the estimated lower bound of the mutual information into a loss function to determine the mutual information loss 410 between the sets of encoded word representation vectors.

As noted, in one or more embodiments, the relation extraction system 102 determines the mutual information by first aggregating the vectors in H and H' into the overall representation vectors $\bar{h}$ and $\bar{h}'$ by utilizing a max-pooling function: $h = \text{Max\_Pooling}(h_1, h_2, \ldots, h_N)$ and $$\bar{h}' = \text{Max\_Pooling}(h'_1, h'_2, \ldots, h'_N).$$

The relation extraction system 102 then determines the mutual information between $\bar{h}$ and $\bar{h}'$.

The relation extraction system 102 can utilize a variety of algorithms to determine a measure of mutual information. For example, in one or more embodiments, the relation extraction system 102 estimates the lower bound of the mutual information between the vectors via adversarial training. More specifically, the relation extraction system 102 applies the adversarial approach to obtain the mutual information lower bound via the binary cross entropy of a variable discriminator, which differentiates vectors sampled from a joint distribution from those sampled from the product of the marginal distribution of the variables (i.e., $\bar{h}$ and $\bar{h}'$). As one example, in one or more embodiments, the relation extraction system 102 utilizes a mutual information neural estimation, as described by Amir Pouran Ben Veyseh, et al., in "Multi-View Consistency for Relation Extraction via Mutual Information and Structure Prediction," Proceedings of the 58th Annual Meeting of the Association for Computational Linguistics, 4393-4399 (2019) (hereinafter Multi-View Consistency), which is incorporated by reference herein in its entirety.

To illustrate, the relation extraction system 102 samples the product of the marginal distribution by concatenating the representation $\bar{h}$ with $\hat{h}'$, where $\hat{h}'$ is the aggregated vector (with max-pooling) of the vectors from the RL neural network from a separate word sequence in the same batch as the sequence W (i.e., the negative example). The relation extraction system 102 feeds the samples into a 2-layer feed forward neural network D (the discriminator) to perform a binary classification from the joint distribution or product of the marginal distributions. The relation extraction system 102 then uses the following binary cross entropy loss to estimate the mutual information between $\bar{h}$ and $\bar{h}'$: $L_{disc} = -(\log(D[\bar{h}, \bar{h}']) + \log(1 - D([\bar{h}, \hat{h}'])))$.

In one or more additional embodiments, as mentioned, the relation extraction system 102 utilizes a control mechanism to retain consistent semantic information within the semantic view of the relation extraction system 102. In particular, the relation extraction system 102 can utilize the control mechanism described in Multi-View Consistency, which is incorporated by reference above. For example, the relation extraction system 102 obtains a control vector c from the representation vectors in H, emphasizing on the representation vectors of the entity mentions $h_s$ and $h_o$. The relation extraction system 102 then applies the control vector directly to the representation vectors in H" to obtain a new vector $$\bar{h}''_i$$

for each vector $$h''_i \in H'' : \bar{h}''_i = c \odot h''_i.$$

In one or more embodiments, $\bar{h}''$ represents the max-pooling aggregation vector for the representation vectors $$\bar{h}_i'' : \bar{h}'' = \text{Max\_pooling}(\bar{h}_1'', \bar{h}_2'', \ldots, \bar{h}_N'').$$

The relation extraction system 102 thus provides consistent semantic information in H″ via direct incorporation of the control vector. In at least some embodiments, the relation extraction system 102 uses the control mechanism and the mutual information constraints interchangeably for semantic consistency between H, H′, and H″.

Figure 4C:
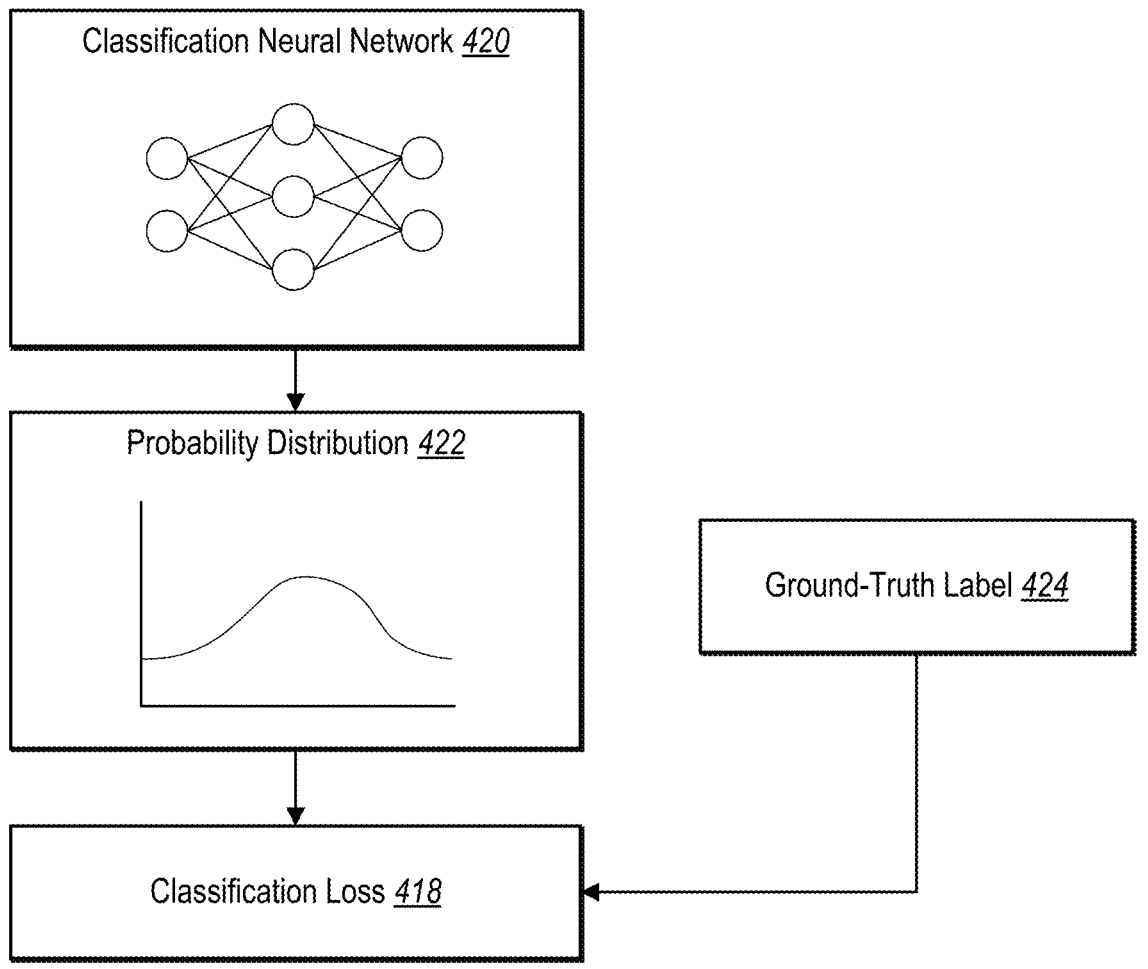

FIG. 4C illustrates an embodiment of a classification loss 418 that indicates a loss based on an accuracy of a prediction of a classification neural network 420. In one or more embodiments, a classification loss includes a loss that indicates a difference between a predicted label for a relationship between two entities and a ground-truth label (e.g., a true label) for the relationship between two entities. Specifically, as previously mentioned, the relation extraction system 102 utilizes a plurality of neural networks to generate an overall word representation vector for a word sequence. The relation extraction system 102 then utilizes the classification neural network 420 to generate a probability distribution 422 indicating probabilities that a plurality of possible relationships correspond to a relationship between entities mentioned in the word sequence.

In one or more embodiments, the relation extraction system 102 compares the probability distribution 422 generated by the classification neural network 420 to a ground-truth label 424. For example, the ground-truth label 424 includes a true relation label of entities mentioned in a word sequence corresponding to the probability distribution 422. The relation extraction system 102 generates the classification loss 418 by utilizing a loss function to determine the difference between the probability distribution 422 and the ground-truth label 424. In one or more embodiments, the loss function includes a negative log-likelihood of the probability distribution 422 based on the ground-truth label 424.

In one or more embodiments, the relation extraction system 102 predicts relationships between two entity mentions $w_s$ and $w_o$ by combining encoded word representation vectors generated by a bidirectional long short-term memory neural network, a ranked neurons long short-term memory neural network, and a self-attention neural network (e.g., a self-attention layer) to obtain an overall word representation vector R for a word sequence. The relation extraction system 102 generates the overall word representation vector R by combining the max-pooling aggregation vectors from the three separate components (e.g., $\bar{h}$, $\bar{h}'$, and $\bar{h}''$), as well as the corresponding encoded word representation vectors for the two entity mentions (e.g., $h_s$, $h_o$, $h_s'$, $h_o'$, $h_s''$, and $h_o''$):

$$R = [\bar{h}, \bar{h}', \bar{h}'', h_s, h_o, h_s', h_o', h_s'', h_o''].$$

In one or more embodiments, the relation extraction system 102 then feeds R into a 2-layer feed forward neural network followed by a softmax layer to determine the probability distribution P(.|W,s,o) over the possible relationships for the entities. Additionally, in one or more embodiments, the relation extraction system 102 utilizes a loss function including a negative loss-likelihood: $L_{pred} = -P$(y|W,s,o), where y is the ground-truth label for the input sequence.

Figure 4D:
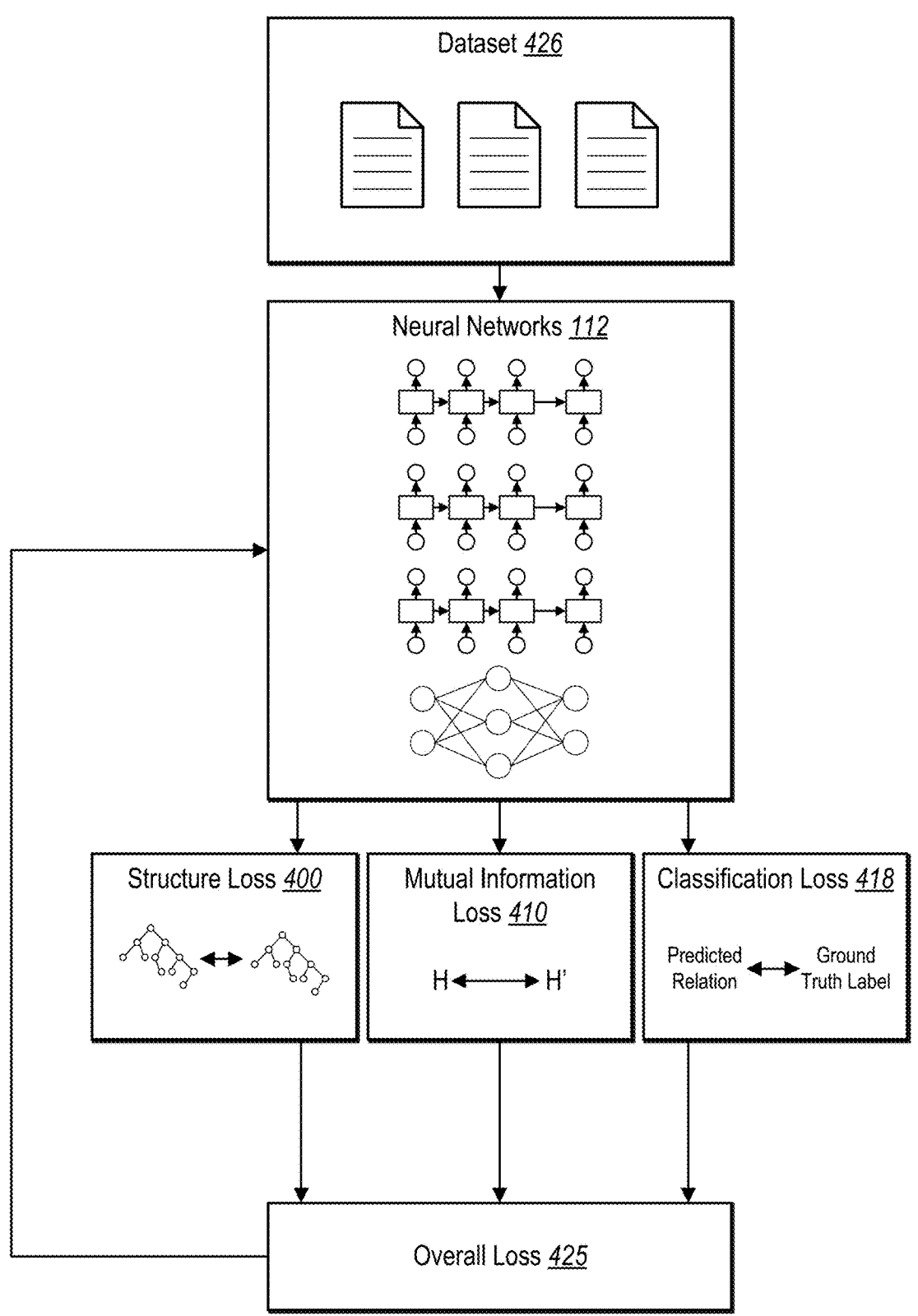

FIG. 4D illustrates that the relation extraction system 102 determines an overall loss 425 corresponding to a word sequence based on a plurality of different losses. For instance, the relation extraction system 102 utilizes the neural networks 112 to process a dataset 426 including a plurality of word sequences with known entities and known labels for relationships between the entities. In one or more embodiments, the dataset 426 includes a plurality of documents with text corresponding to one or more knowledge domains.

In connection with determining relationships between entities in word sequences of the dataset 426, the relation extraction system 102 also determines the structure loss 400, the mutual information loss 410, and the classification loss 418. In one or more embodiments, the relation extraction system 102 combines the structure loss 400, the mutual information loss 410, and the classification loss 418 to generate the overall loss 425. For instance, the relation extraction system 102 utilizes the loss function $L = L_{pred} + \alpha L_{disc} + \beta L_{structure}$, in which $\alpha$ and $\beta$ are trade-off parameters. Furthermore, in one or more embodiments, the relation extraction system 102 utilizes the overall loss 425 to jointly train the plurality of neural networks in the relation extraction system 102 including a bidirectional long short-term memory neural network, a ranked neurons long short-term memory neural network, a self-attention neural network, and/or a classification neural network.

In particular, the relation extraction system 102 can back-propagate the overall loss 425 to the neural networks 112. The relation extraction system 102 can modify parameters of the neural networks 112 to reduce the overall loss 425. By iteratively determining the overall loss 425 with different training batches from the dataset 426 and modifying the parameters of the neural networks 112 to reduce the overall loss 425, the relation extraction system 102 can learn parameters of the neural networks 112 that accurately determine relations between entities in word sequences.

As mentioned above, researchers have conducted experiments to evaluate the efficacy of example embodiments of the relation extraction system 102 relative to conventional systems. In particular, experiments conducted with an experimental embodiment that of the relation extraction system 102 relative to a plurality of existing models (as shown in the table below) on a plurality of different domains in the ACE 2005 dataset reveal that the relation extraction system 102 can improve upon the existing models. Specifically, the example embodiment of the relation extraction system 102 significantly outperforms the existing models on all text sets with p<0.01. To illustrate, the example embodiment of the relation extraction system 102 improves the average F1 score of the deep sequential models by ~10%, while the performance improvement for the structure-based model is over 4%, as illustrated in the table below.

| System | bc | Cts | wl | Average |
|---|---|---|---|---|
| Shi | 66.38 | 57.92 | 56.84 | 60.38 |
| Guo | 63.47 | 59.70 | 56.50 | 59.89 |
| Tran | 65.06 | 61.71 | 59.82 | 62.20 |
| Veyseh | 67.30 | 64.28 | 60.19 | 63.92 |
| RES | 70.32 | 66.43 | 64.61 | 68.20 |

As illustrated in the table above, the example embodiment of the relation extraction system 102 ("RES") outperforms the existing systems. Specifically, "Veyseh" refers to a system described by Amir Pouran Ben Veyseh, Thien Huu Nguyen, and Dejing Dow in "Improving cross-domain performance for relation extraction via dependency prediction and information flow control" in IJCAI 2019. Additionally, "Tran" refers to a system described by Van-Hien Tran, Van-Thuy Phi, Hiroyuki Shindo, and Yuji Matsumoto in "Relation classification using segment-level attention-based CNN and dependency-based RNN" in Proceedings of the 2019 Conference of the North American Chapter of the Association for Computational Linguistics: Human Language Technologies. Furthermore, "Guo" refers to a system described by Zhijiang Guo, Yan Zhang, and Wei Lu in "Attention Guided Graph Convolutional Networks for Relation Extraction" in ACL 2019. "Shi" refers to a system described by Ge Shi, Chong Feng, Lifu Huang, Boliang Zhang, Heng Ji, Lejeian Liao, and Heyan Huang in "Genre separation network with adversarial training for cross-genre relation extraction" in EMNLP 2018.

Figure 5:
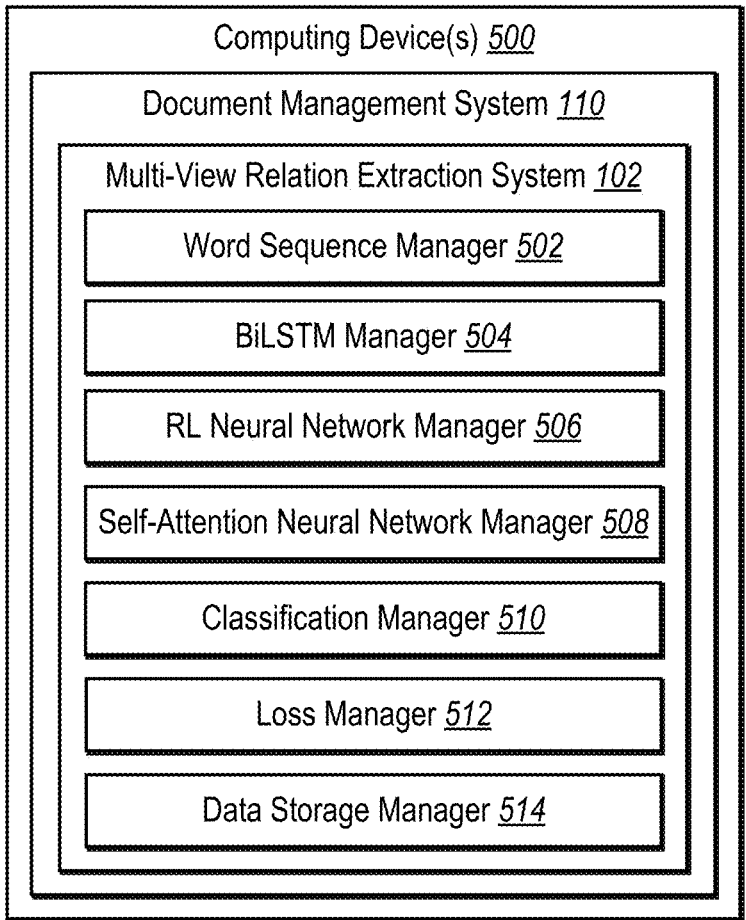
FIG. 5 illustrates a diagram of the multi-view relation extraction system of FIG. 1 in accordance with one or more implementations.

FIG. 5 illustrates a detailed schematic diagram of an embodiment of the relation extraction system 102 described above. As shown, the relation extraction system 102 is implemented in the document management system 110 on computing device(s) 500 (e.g., a client device and/or server device as described in FIG. 1, and as further described below in relation to FIG. 7). Additionally, the relation extraction system 102 can include, but is not limited to, a word sequence manager 502, a BiLSTM manager 504, an RL neural network manager 506, a self-attention neural network manager 508, a classification manager 510, a loss manager 512, and a data storage manager 514. In one or more embodiments, the relation extraction system 102 is implemented on any number of computing devices. For example, the relation extraction system 102 can be implemented in a distributed system of server devices for managing digital content. The relation extraction system 102 can also be implemented within one or more additional systems. Alternatively, the relation extraction system 102 can be implemented on a single computing device such as a single client device.

In one or more embodiments, each of the components of the relation extraction system 102 is in communication with other components using any suitable communication technologies. Additionally, the components of the relation extraction system 102 can be in communication with one or more other devices including other computing devices of a user, server devices (e.g., cloud storage devices), licensing servers, or other devices/systems. It will be recognized that although the components of the relation extraction system 102 are shown to be separate in FIG. 7, any of the subcomponents may be combined into fewer components, such as into a single component, or divided into more components as may serve a particular implementation. Furthermore, although the components of FIG. 5 are described in connection with the relation extraction system 102, at least some of the components for performing operations in conjunction with the relation extraction system 102 described herein may be implemented on other devices within the environment.

The components of the relation extraction system 102 can include software, hardware, or both. For example, the components of the relation extraction system 102 include one or more instructions stored on a computer-readable storage medium and executable by processors of one or more computing devices (e.g., the computing device(s) 500). When executed by the one or more processors, the computer-executable instructions of the relation extraction system 102 cause the computing device(s) 500 to perform the operations described herein. Alternatively, the components of the relation extraction system 102 include hardware, such as a special purpose processing device to perform a certain function or group of functions. Additionally, or alternatively, the components of the relation extraction system 102 include a combination of computer-executable instructions and hardware.

Furthermore, the components of the relation extraction system 102 performing the functions described herein with respect to the relation extraction system 102 may, for example, be implemented as part of a stand-alone application, as a module of an application, as a plug-in for applications, as a library function or functions that may be called by other applications, and/or as a cloud-computing model. Thus, the components of the relation extraction system 102 may be implemented as part of a stand-alone application on a personal computing device or a mobile device. Alternatively, or additionally, the components of the relation extraction system 102 may be implemented in any application that provides document management, including, but not limited to ADOBE® DOCUMENT CLOUD®, ADOBE® SENSEI™, or ADOBE® EXPERIENCE MANAGER. The foregoing are either registered trademarks or trademarks of Adobe Inc. in the United States and/or other countries.

As mentioned, the relation extraction system 102 includes a word sequence manager 502 to determine word sequences from documents for extracting relationships between entities from the word sequences. For example, the word sequence manager 502 utilizes language processing to parse word sequences in text documents. In one or more embodiments, the word sequence manager 502 communicates with a document repository to obtain word sequences in connection with one or more knowledge domains. The word sequence manager 502 can also generate embeddings and/or other word representation vectors for words in word sequences to provide to one or more other components of the relation extraction system 102.

The relation extraction system 102 also includes a BiLSTM manager 504 to manage a bidirectional long short-term memory neural network (or long short-term memory neural network). Specifically, the BiLSTM manager 504 manages inputs to the bidirectional long short-term memory neural network (or LSTM), such as by obtaining word representation vectors from the word sequence manager 504 to provide as inputs to the bidirectional long short-term memory neural network. Additionally, the BiLSTM manager 504 manages the outputs of the bidirectional long short-term memory neural network, including determining a set of encoded word representation vectors to include hidden vectors generated by the bidirectional long short-term memory neural network.

The relation extraction system 102 further includes an RL neural network manager 506 to manage a ranked neurons long short-term memory neural network. For example, the RL neural network manager 506 manages inputs to the RL neural network manager 506, such as by obtaining word representation vectors from the word sequence manager 504 to provide as inputs to the ranked neurons long short-term memory neural network. In addition, the RL neural network manager 506 manages the outputs of the ranked neurons long short-term memory neural network, including determining a set of encoded word representation vectors to include hidden vectors and/or structural importance scores generated by the ranked neurons long short-term memory neural network.

In one or more embodiments, the relation extraction system 102 further includes a self-attention neural network manager 508 to manage a self-attention neural network. To illustrate, the self-attention neural network manager 508 manages inputs to one or more layers of the self-attention neural network, including managing inputs to a self-attention layer. In some embodiments, the self-attention neural network manager 508 utilizes the outputs of a bidirectional long short-term memory neural network (e.g., from the BiLSTM manager 504) as inputs to the self-attention layer. Furthermore, the self-attention neural network manager 508 manages outputs of the self-attention layer, including hidden vectors and/or semantic importance scores generated by the self-attention layer.

Additionally, the relation extraction system 102 includes a classification manager 510 to classify relationships of entities mentioned in word sequences. In particular, the classification manager 510 generates labels for relationships between entities based on outputs of a plurality of neural networks in a structural view and a semantic view of the relation extraction system 102. For example, the classification manager 510 utilizes a classification neural network processes an overall word representation vector to generate a relationship probability distribution. The classification manager 510 then determines the relationship based on the probability distribution.

FIG. 5 illustrates that the relation extraction system 102 includes a loss manager 512 to manage a plurality of losses for training a plurality of neural networks that perform multi-view relation extraction. For instance, the loss manager 512 determines a structure loss, a mutual information loss, and a classification loss based on the structural view, the semantic view, and the classification neural network. Additionally, in one or more embodiments, the loss manager 512 manages a control mechanism for enforcing consistency within a semantic view of the relation extraction system 102. The loss manager 512 also utilizes the losses to train the neural networks to improve structural and semantic consistency between the views and to improve classification accuracy.

Additionally, the relation extraction system 102 also includes a data storage manager 514 (that comprises a non-transitory computer memory/one or more memory devices) that stores and maintains data associated with documents including text. For example, the data storage manager 514 stores information associated with extracting relationships between entities mentioned in word sequences. To illustrate, the data storage manager 514 stores word sequences, word representation vectors, encoded word representation vectors, probability distributions, dependency trees, semantic graph structures, inputs and outputs of neural networks, the neural networks described above, and extracted relationships.

Turning now to FIG. 6, this figure shows a flowchart of a series of acts 600 of utilizing neural networks in multi-view relation extraction from word sequences. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

As shown, the series of acts 600 includes an act 602 of generating a first set of encoded word representation vectors for a word sequence utilizing a long short-term memory ("LSTM") neural network. For example, act 602 involves generating, utilizing a long short-term memory neural network, a first set of encoded word representation vectors for a sequence of words comprising at least two entities. In one or more embodiments, the sequence of words includes one or more sentences in a text document, wherein the one or more sentences mention the at least two entities and a relationship between the at least two entities.

Additionally, the series of acts 600 includes an act 604 of generating a second set of encoded word representation vectors for the word sequence utilizing a ranked neurons LSTM neural network. For example, act 604 can involve utilizing a cummax activation function to determine hidden vectors for a plurality of additional master gates comprising a forget gate and an input gate to each step in the ranked neurons long short-term memory neural network.

Act 604 can also include an additional act 606 of generating a set of structural importance scores for the word sequence. For example, act 606 can involve generating a set of a set of structural importance scores indicating a proximity of each word in the sequence of words to a root node of a tree structure. In one or more embodiments, act 606 involves generating, utilizing a set of forget gates of the ranked neurons long short-term memory neural network, the set of structural importance scores indicating the proximity of each word to the root node of the tree structure. Additionally, act 606 can involve generating the second set of encoded word representation vectors based on the set of structural importance scores. For example, act 606 can involve generating, based on the set of structural importance scores, the second set of encoded word representation vectors comprising a plurality of hidden vectors from the ranked neurons long short-term memory neural network.

Furthermore, the series of acts 600 includes an act 608 of generating a third set of encoded word representation vectors for the word sequence utilizing a self-attention neural network. For example, act 608 involves generating, utilizing a self-attention neural network, a third set of encoded word representation vectors for the sequence of words. For example, act 608 can involve generating, utilizing the self-attention neural network, key vectors, query vectors, and value vectors for the first set of encoded word representation vectors. Act 608 can then involve generating, utilizing the self-attention neural network, the third set of encoded word representation vectors based on the key vectors, the query vectors, and the value vectors. In one or more embodiments, the self-attention neural network includes a bidirectional long short-term memory neural network followed by a self-attention layer.

Act 608 can also include an additional act 610 of generating a set of semantic importance scores for the word sequence. Act 610 can involve generating, for pairs of words in the sequence of words, semantic connection scores indicating semantic connections between the pairs of words by utilizing the self-attention neural network to process corresponding pairs of encoded word representation vectors of the first set of encoded word representation vector. Act 610 can then involve generating the third set of encoded word representation vectors based on the semantic connection scores for the pairs of words in the sequence of words.

Act 610, or an additional act, can also involve generating the third set of encoded word representation vectors based on a control mechanism between the long short-term memory neural network and the self-attention layer. For example, the series of acts 600 can include determining a control vector from the first set of encoded word representation vectors, and incorporating the control vector into the third set of encoded word representation vectors.

In one or more embodiments, the series of acts 600 also includes generating a sequence of word representation vectors based on word embeddings for the sequence of words and position embeddings indicating positions of the at least two entities within the sequence of words. The series of acts also includes generating the first set of encoded word representation vectors, the second set of encoded word representation vectors, and the third set of encoded word representation vectors from the sequence of word representation vectors.

The series of acts 600 also includes an act 612 of extracting a relationship between two entities from the word sequence. For example, act 612 involves extracting a relationship between the two entities in the sequence of words utilizing the first set of encoded word representation vectors, the second set of encoded word representation vectors, and the third set of encoded word representation vectors.

Act 612 can involve generating, utilizing a classification neural network, an overall word representation vector by combining the first set of encoded word representation vectors, the second set of encoded word representation vectors, and the third set of encoded word representation vectors. For example, act 612 can involve determining max-pooling aggregation vectors based on the first set of encoded word representation vectors, the second set of encoded word representation vectors, and the third set of encoded word representation vectors and then combining the max-pooling aggregation vectors into the overall word representation vector.

Act 612 can include an additional act 614 of generating a relationship probability distribution. For example, act 614 can involve generating, utilizing a classification neural network, a relationship probability distribution over possible relationships for the two entities based on the overall word representation vector. In one or more embodiments, act 614 involves utilizing a 2-layer feed forward neural network followed by a softmax layer to generate the relationship probability distribution. Act 612 can then involve extracting the relationship between the two entities by selecting the relationship from the relationship probability distribution. For example, act 612 can involve selecting a possible relationship with a highest relationship probability as the relationship between the at least two entities.

The series of acts 600 can further include determining a classification loss by determining a negative log-likelihood of the relationship probability distribution. Additionally, the series of acts 600 can include learning parameters of the long short-term memory neural network, the ranked neurons long short-term memory neural network, or the self-attention neural network according to the classification loss.

The series of acts 600 can also include determining an importance probability distribution from the set of structural importance scores and a semantic probability distribution from the set of semantic connection scores. Additionally, the series of acts 600 can include determining a structure loss based on a Kullback-Leibler divergence between the importance probability distribution and the semantic probability distribution. The series of acts 600 can then include learning parameters of the long short-term memory neural network, the ranked neurons long short-term memory neural network, or the self-attention neural network according to the structure loss.

Furthermore, the series of acts 600 can include determining, utilizing a variable discriminator, an estimated mutual information metric between the first set of encoded word representation vectors and the second set of encoded word representation vectors. The series of acts 600 can then include determining a mutual information loss based on the estimated mutual information metric. The series of acts 600 can also include learning parameters of the long short-term memory neural network, the ranked neurons long short-term memory neural network, or the self-attention neural network according to the mutual information loss.

The series of acts 600 can include determining an overall loss based on a classification loss, a structure loss, and a mutual information loss. The series of acts 600 can then include jointly learning parameters of the long short-term memory neural network, the ranked neurons long short-term memory neural network, and the self-attention neural network based on the overall loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
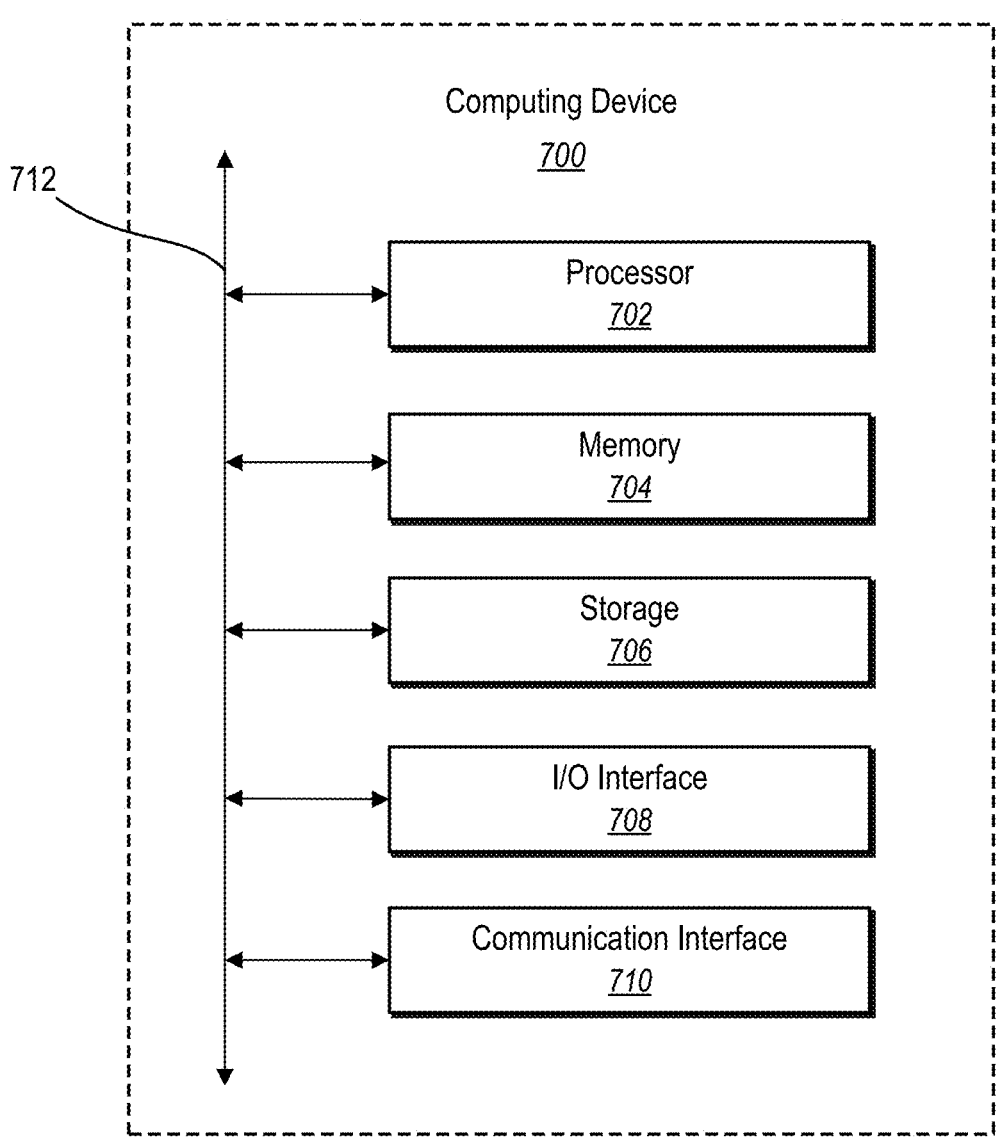
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the system(s) of FIG. 1. As shown by FIG. 7, the computing device 700 can comprise a processor 702, a memory 704, a storage device 706, an I/O interface 708, and a communication interface 710, which may be communicatively coupled by way of a communication infrastructure 712. In certain embodiments, the computing device 700 can include fewer or more components than those shown in FIG. 7. Components of the computing device 700 shown in FIG. 7 will now be described in additional detail.

In one or more embodiments, the processor 702 includes hardware for executing instructions, such as those making up a computer program. As an example, and not by way of limitation, to execute instructions for dynamically modifying workflows, the processor 702 may retrieve (or fetch) the instructions from an internal register, an internal cache, the memory 704, or the storage device 706 and decode and execute them. The memory 704 may be a volatile or non-volatile memory used for storing data, metadata, and programs for execution by the processor(s). The storage device 706 includes storage, such as a hard disk, flash disk drive, or other digital storage device, for storing data or instructions for performing the methods described herein.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example, and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 710 may facilitate communications with various types of wired or wireless networks. The communication interface 710 may also facilitate communications using various communication protocols. The communication infrastructure 712 may also include hardware, software, or both that couples components of the computing device 700 to each other. For example, the communication interface 710 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:

generate, utilizing a long short-term memory neural network, a first set of encoded word representation vectors for a sequence of words comprising at least two entities;

generate, utilizing a ranked neurons long short-term memory neural network, a second set of encoded word representation vectors for the sequence of words;

generate, utilizing a self-attention neural network and from the first set of encoded word representation vectors, a third set of encoded word representation vectors for the sequence of words by:

generating an initial set of encoded word representation vectors utilizing the self-attention neural network; and generating the third set of encoded word representation vectors by modifying the initial set of encoded word representation vectors according to a control vector selected from the first set of encoded word representation vectors; and extract, utilizing a classification neural network, a relationship between the at least two entities in the sequence of words by providing the first set of encoded word representation vectors generated by the long short-term memory neural network, the second set of encoded word representation vectors generated by the ranked neurons long short-term memory neural network, and the third set of encoded word representation vectors generated by the self-attention neural network to the classification neural network.

2. The non-transitory computer readable storage medium as recited in claim 1, further comprising instructions that, when executed by the at least one processor, cause the computing device to:

generate a sequence of word representation vectors based on word embeddings for the sequence of words and position embeddings indicating positions of the at least two entities within the sequence of words; and generate the first set of encoded word representation vectors, the second set of encoded word representation vectors, and the third set of encoded word representation vectors from the sequence of word representation vectors.

3. The non-transitory computer readable storage medium as recited in claim 1, further comprising instructions that, when executed by the at least one processor, cause the computing device to:

determine an overall word representation vector by combining max-pooling aggregation vectors of the first set of encoded word representation vectors, the second set of encoded word representation vectors, and the third set of encoded word representation vectors with encoded word representation vectors of the at least two entities; and extract the relationship between the at least two entities from the overall word representation vector utilizing the classification neural network.

4. The non-transitory computer readable storage medium as recited in claim 1, further comprising instructions that, when executed by the at least one processor, cause the computing device to generate, utilizing the ranked neurons long short-term memory neural network, the second set of encoded word representation vectors by:

generating a set of structural importance scores indicating a proximity of each word in the sequence of words to a root node of a tree structure; and generating the second set of encoded word representation vectors based on the set of structural importance scores.

5. The non-transitory computer readable storage medium as recited in claim 4, further comprising instructions that, when executed by the at least one processor, cause the computing device to:

generate, utilizing the self-attention neural network, key vectors, query vectors, and value vectors for the first set of encoded word representation vectors; and generate, utilizing the self-attention neural network, the third set of encoded word representation vectors based on the key vectors, the query vectors, and the value vectors.

6. The non-transitory computer readable storage medium as recited in claim 5, further comprising instructions that, when executed by the at least one processor, cause the computing device to:

generate, utilizing the self-attention neural network, a set of semantic connection scores between each pair of words in the sequence of words indicating a semantic graph structure based on the key vectors and the query vectors;

determine an importance probability distribution from the set of structural importance scores and a semantic probability distribution from the set of semantic connection scores;

determine a structure loss based on a Kullback-Leibler divergence between the importance probability distribution and the semantic probability distribution; and learn parameters of the long short-term memory neural network, the ranked neurons long short-term memory neural network, or the self-attention neural network according to the structure loss.

7. The non-transitory computer readable storage medium as recited in claim 1, further comprising instructions that, when executed by the at least one processor, cause the computing device to:

determine, utilizing a variable discriminator, an estimated mutual information metric between the first set of encoded word representation vectors and the second set of encoded word representation vectors;

determine a mutual information loss based on the estimated mutual information metric; and learn parameters of the long short-term memory neural network, the ranked neurons long short-term memory neural network, or the self-attention neural network according to the mutual information loss.

8. The non-transitory computer readable storage medium as recited in claim 1, further comprising instructions that, when executed by the at least one processor, cause the computing device to extract the relationship between the at least two entities by:

generating, utilizing a classification neural network, an overall word representation vector by combining the first set of encoded word representation vectors, the second set of encoded word representation vectors, and the third set of encoded word representation vectors;

generating, utilizing a classification neural network, a relationship probability distribution over possible relationships for the at least two entities based on the overall word representation vector; and generating a label indicating the relationship between the at least two entities from the relationship probability distribution.

9. The non-transitory computer readable storage medium as recited in claim 8, further comprising instructions that, when executed by the at least one processor, cause the computing device to:

determine a classification loss by determining a negative log-likelihood of the relationship probability distribution; and learn parameters of the long short-term memory neural network, the ranked neurons long short-term memory neural network, or the self-attention neural network according to the classification loss.

10. A system comprising:

a memory device comprising:

a sequence of words comprising a first entity and a second entity; and a long short-term memory neural network, a ranked neurons long short-term memory neural network, a self-attention neural network, and a classification neural network;

a computing device configured to cause the system to:

generate word representation vectors for the sequence of words;

generate a first set of encoded word representation vectors, a second set of encoded word representation vectors, and a third set of encoded word representation vectors by processing the word representation vectors utilizing the long short-term memory neural network, the ranked neurons long short-term memory neural network, and the self-attention neural network, the self-attention neural network generating the third set of encoded word representation vectors from the first set of encoded word representation vectors generated by the long short-term memory neural network by:

generating an initial set of encoded word representation vectors utilizing the self-attention neural network; and generating the third set of encoded word representation vectors by modifying the initial set of encoded word representation vectors according to a control vector selected from the first set of encoded word representation vectors;

generate an overall word representation vector by combining the first set of encoded word representation vectors from the long short-term memory neural network, the second set of encoded word representation vectors from the ranked neurons long short-term memory neural network, and the third set of encoded word representation vectors from the self-attention neural network; and determine a relationship between the first entity and the second entity in the sequence of words by processing the overall word representation vector utilizing the classification neural network.

11. The system as recited in claim 10, wherein the computing device is further configured to cause the system to generate the second set of encoded word representation vectors by:

generating, utilizing a set of forget gates of the ranked neurons long short-term memory neural network, a set of structural importance scores indicating a proximity of each word to a root node of a tree structure; and generating, based on the set of structural importance scores, the second set of encoded word representation vectors comprising a plurality of hidden vectors from the ranked neurons long short-term memory neural network.

12. The system as recited in claim 10, wherein the computing device is further configured to cause the system to generate the third set of encoded word representation vectors by:

generating, for pairs of words in the sequence of words, semantic connection scores indicating semantic connections between the pairs of words by utilizing the self-attention neural network to process corresponding pairs of encoded word representation vectors of the first set of encoded word representation vectors; and generating the third set of encoded word representation vectors based on the semantic connection scores for the pairs of words in the sequence of words.

13. The system as recited in claim 10, wherein the computing device is further configured to cause the system to determine the relationship between the first entity and the second entity by:

generating, from the overall word representation vector, a relationship probability distribution over a plurality of possible relationships between the first entity and the second entity; and determining the relationship between the first entity and the second entity based on the relationship probability distribution.

14. The system as recited in claim 10, wherein the computing device is further configured to cause the system to:

determine a structure loss based on a set of structural importance scores associated with the ranked neurons long short-term memory neural network and a set of semantic importance scores associated with the self-attention neural network; and learn parameters of the long short-term memory neural network, the ranked neurons long short-term memory neural network, and the self-attention neural network based on the structure loss.

15. The system as recited in claim 10, wherein the computing device is further configured to cause the system to:

determine a mutual information loss based on a mutual information metric between the first set of encoded word representation vectors and the second set of encoded word representation vectors; and learn parameters of the long short-term memory neural network, the ranked neurons long short-term memory neural network, or the self-attention neural network based on the mutual information loss.

16. The system as recited in claim 10, wherein the computing device is further configured to cause the system to:

determine a classification loss by comparing a classification prediction generated by the classification neural network from the overall word representation vector to a ground truth classification; and learn parameters of the long short-term memory neural network, the ranked neurons long short-term memory neural network, or the self-attention neural network based on the classification loss.

17. A method comprising:

generating word representation vectors for a sequence of words comprising a first entity and a second entity;

generating an overall word representation vector including a plurality of sets of encoded word representation vectors from the word representation vectors by generating a first set of encoded word representation vectors utilizing a long short-term memory neural network, a second set of encoded word representation vectors utilizing a ranked neurons long short-term memory neural network, and a third set of encoded word representation vectors from the first set of encoded word representation vectors utilizing a self-attention neural network, the self-attention neural network generating the third set of encoded word representation vectors by:

generating an initial set of encoded word representation vectors utilizing the self-attention neural network; and generating the third set of encoded word representation vectors by modifying the initial set of encoded word representation vectors according to a control vector selected from the first set of encoded word representation vectors;

wherein parameters of the long short-term memory neural network, the ranked neurons long short-term memory neural network, and the self-attention neural network are jointly learned based on a classification loss, a structure loss, and a mutual information loss; and extract a relationship between the first entity and the second entity in the sequence of words by processing the overall word representation vector utilizing a classification neural network.

18. The method as recited in claim 17, wherein generating the overall word representation vector comprises:

combining the first set of encoded word representation vectors, the second set of encoded word representation vectors, and the third set of encoded word representation vectors into the overall word representation vector by:

determining max-pooling aggregation vectors of the first set of encoded word representation vectors, the second set of encoded word representation vectors, and the third set of encoded word representation vectors; and combining the max-pooling aggregation vectors with encoded word representation vectors of the first entity and the second entity.

19. The method as recited in claim 17, wherein extracting the relationship between the first entity and the second entity comprises:

generating, utilizing the classification neural network, a plurality of classification probabilities associated with a plurality of possible relationships for the first entity and the second entity; and selecting, from the plurality of possible relationships, a possible relationship with a highest relationship probability as the relationship between the first entity and the second entity.

20. The method as recited in claim 17, further comprising determining a total loss comprising the classification loss, the structure loss, and the mutual information loss by weighting the structure loss with a first weighting parameter and the mutual information loss with a second weighting parameter.

* * * * *